US005565857A

United States Patent [19]
Lee

[11] Patent Number: 5,565,857
[45] Date of Patent: Oct. 15, 1996

[54] ELECTRONIC INDENTIFICATION SYSTEM HAVING REMOTE AUTOMATIC RESPONSE CAPABILITY AND AUTOMATIC IDENTIFICATION METHOD THEREOF

[76] Inventor: Kwang-sil Lee, 94-144 Shinlimbon-dong, Kwanak-ku, Seoul, Rep. of Korea

[21] Appl. No.: 455,166

[22] Filed: May 31, 1995

Related U.S. Application Data

[62] Division of Ser. No. 81,307, Jun. 24, 1993, Pat. No. 5,475,377.

[30] Foreign Application Priority Data

Oct. 31, 1991 [KR] Rep. of Korea ...................... 91-19330
Oct. 29, 1992 [KR] Rep. of Korea ...................... 92-19930

[51] Int. Cl.⁶ .................................................. H04Q 3/00
[52] U.S. Cl. .................... 340/825.34; 235/375; 235/383; 235/384
[58] Field of Search ..................... 340/825.34; 235/375, 235/383, 384

[56] References Cited

U.S. PATENT DOCUMENTS

| | | |
|---|---|---|
| 5,001,473 | 3/1991 | Ritter et al. . |
| 5,012,402 | 4/1991 | Akiyama . |
| 5,107,258 | 4/1992 | Soum . |
| 5,252,960 | 10/1993 | Duhame . |
| 5,319,711 | 6/1994 | Servi . |
| 5,475,377 | 12/1995 | Lee ..................................... 340/825.34 |

Primary Examiner—Harold Pitts
Attorney, Agent, or Firm—Lowe, Price, LeBlanc & Becker

[57] ABSTRACT

Disclosed are an electronic identification system having remote automatic response capability comprising a wireless portable electronic apparatus (100) for data transmission and reception and a wireless automatic identification control apparatus (200) for data transmission and reception, and an automatic identification control method thereof. The portable electronic apparatus (100) comprises a first memory (130) for storing a user access code and password plus a specific code which are assigned to at least one automatic identification control apparatus (200), a receiver (140), a transmitter (150), and a controller (120) for generating an identification signal using the user access code if a received specific code matches one of a plurality of specific codes registered in the first memory (130). The automatic identification control apparatus (200) comprises a second memory (240) for storing user access codes assigned to at least one portable electronic apparatus (100), a specific code and an administrator's password, a detector (230), a transmitter (250), a receiver (260), a controller (220) for generating a call signal using the specific code and generating a control signal in response to the received identification signal if the received user access code matches one of a plurality of user access codes registered in the second memory (240), and a driver (270) or driving a piece of equipment to be operated in response to the control signal. Since the automatic identification is carried out by means of a mutual call and acknowledgement procedure, integration of various identification control apparatuses is made possible, while enhancing convenience and improving security and safety.

10 Claims, 30 Drawing Sheets

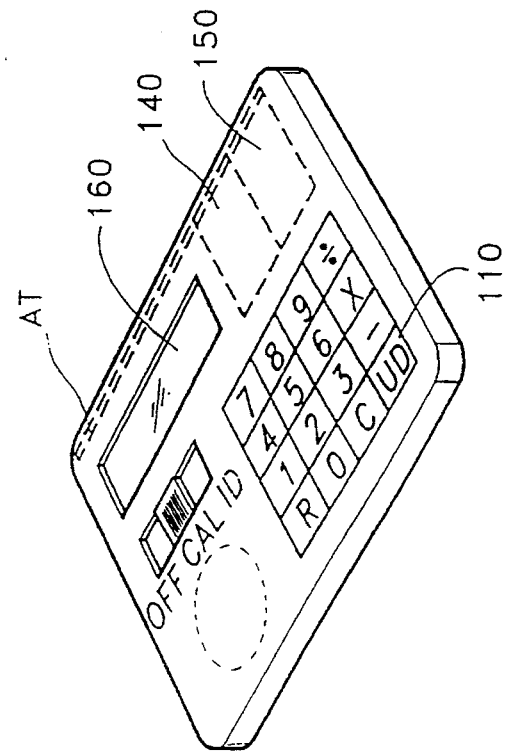
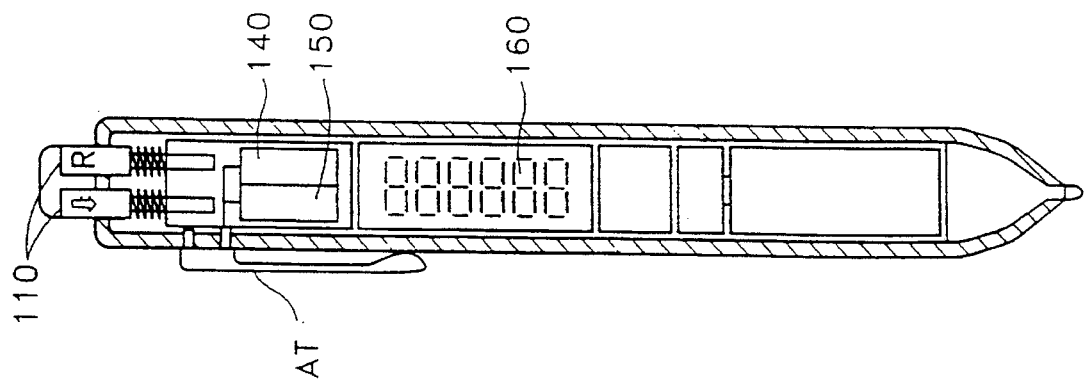
FIG. 2B
FIG. 2A

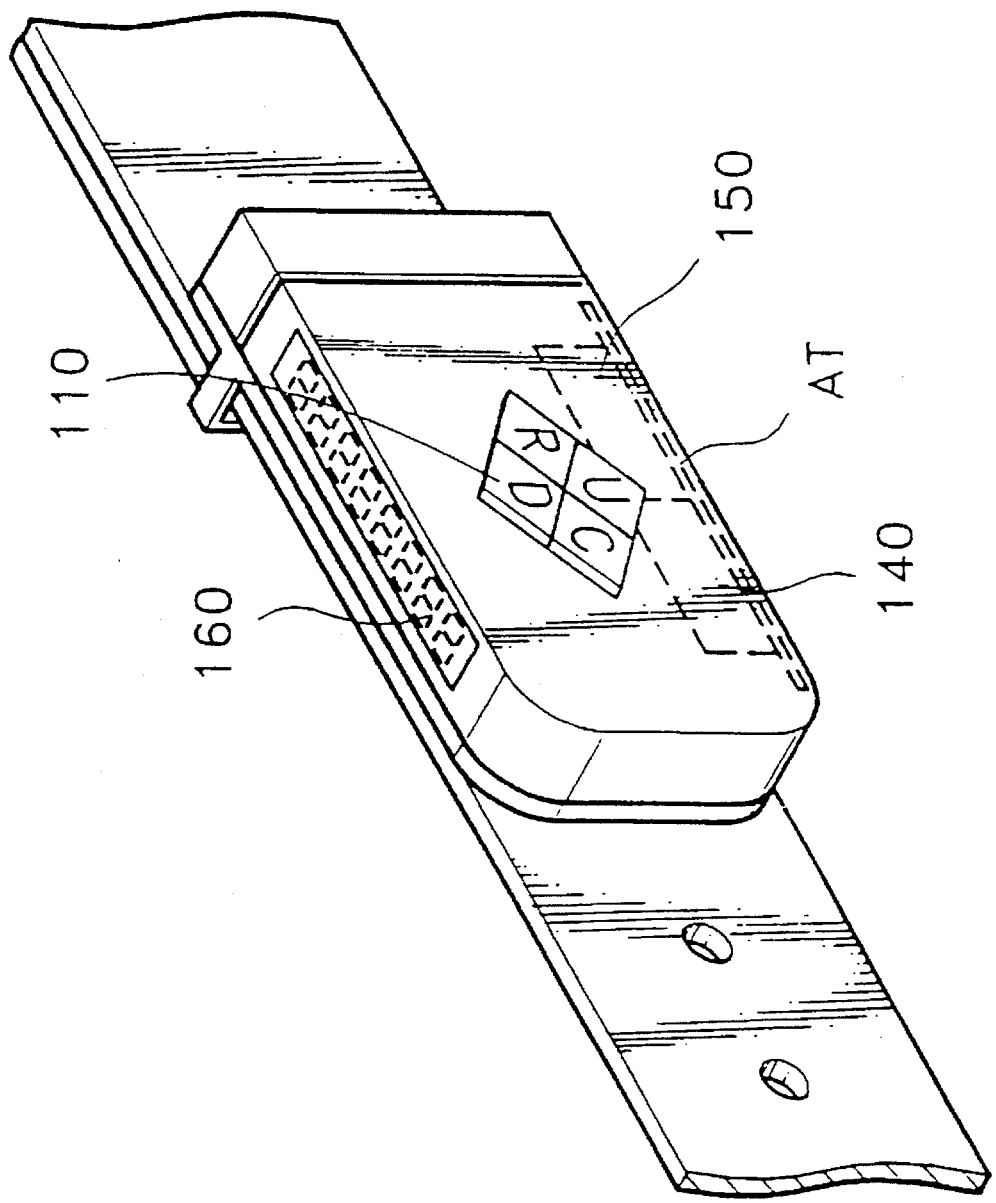

FIG. 3A

| ST | XC | USC | DT | ED |

FIG. 3B

| ST | USC | ADD | DT | ED |

FIG. 4

| 7 | 8 | 9 | ÷ |
| 4 | 5 | 6 | X |
| 1 | 2 | 3 | − |
| R | 0 | C | +/UD |

FIG. 6

| | | |
|---|---|---|
| APW (IAPW) | | MOOO |
| XC₁ | | MAAA |
| USC₁=UPPP | | MFFF |
| UPC₁ | USC | MGGG |
| USC₂=UQQQ | | MHHH |
| UPC₂ | | MIII |
| ... | | |
| USCₙ=XXXX | | MMMM |
| UPCₙ | | MNNN |
| | | |

241 — APW (IAPW)
242 — XC₁
243 — USC

FIG. 5

| | | |
|---|---|---|
| UPW (IUPW) | | U000 |
| PERSONAL ID NO. | | UAAA |
| VEHICLE TYPE/NO. | UPC | UBBB |
| ACCOUNT NO. | | UCCC |
| HEALTH CARD NO. | | UDDD |
| ... | | |
| XC₁ | | UPPP |
| XC₂ | XC | UQQQ |
| ... | | |
| XCₙ | | USSS |
| ... | | |
| USC₁=MFFF | | UPPP+XXX |
| USC₂=MKKK | USC | UQQQ+XXX |
| ... | | |
| USCₙ=XXXX | | USSS+XXX |
| PPA | PREPAID AMOUNT | |

131 — UPW
132 — UPC
133 — XC
134 — USC
135 — PPA

FIG. 15
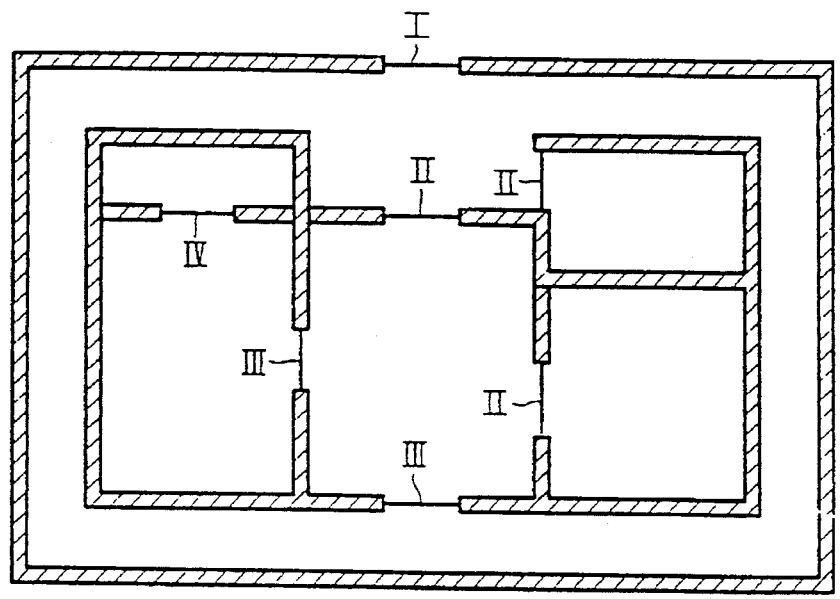
FIG. 16
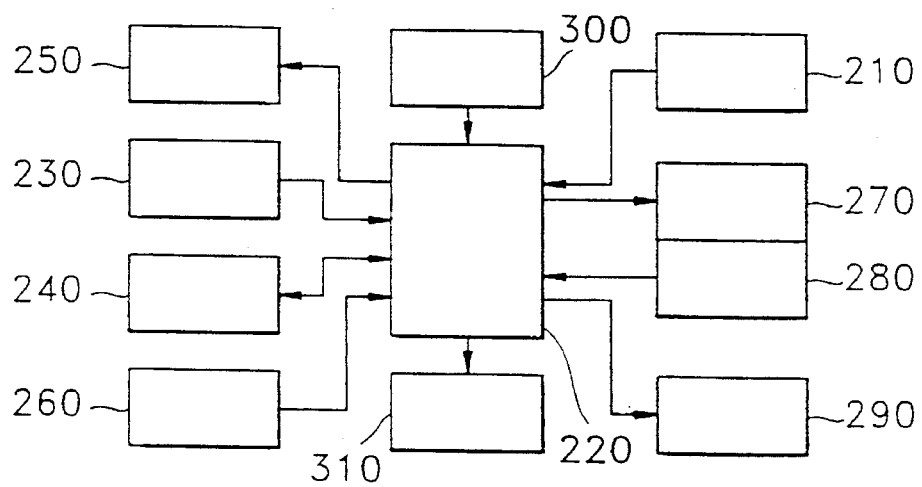
FIG. 17
| 19xx, MONTH, DAY | | | | |
|---|---|---|---|---|
| EMPLOYEE | IN | OUT | HOURS WORKED | LATE/ABSENT |
| 4012 | 08:10 | 18:30 | 10:20 | |
| 3111 | 08:25 | 18:40 | 10:15 | |
| 2002 | 08:20 | 19:00 | 10:40 | |

HOST COMPUTER

FIG. 29C

DEPOSIT MODE: ACCOUNT NO., BALANCE

PLEASE INPUT DEPOSIT AMOUNT

AMOUNT

| 7 | 8 | 9 |
| 4 | 5 | 6 |
| 1 | 2 | 3 |
| * | 0 | # |

ENTER

CANCEL

FIG. 29D

THANK YOU!

USER ACCOUNT NO.

NEW BALANCE

| ACK | DEPOSIT | WITHDRAWAL | REMIT | END |

FIG. 29E

```
WITHDRAWAL MODE: ACCOUNT NO., BALANCE

PLEASE INPUT WITHDRAWAL AMOUNT

AMOUNT 7 8 9    ENTER              QTY.
  4 5 6              10,000
  1 2 3           BN  5,000
  ↑ 0 ↓    CANCEL      1,000
                   CN    500
                         100
```

FIG. 29F

```
REMITTANCE MODE: ACCOUNT NO., BALANCE

PLEASE INPUT RECEIVER'S
ACCOUNT NO. AND AMOUNT

RECEIVER'S ACCOUNT NO.

REMITTANCE 7 8 9    ENTER
   4 5 6
   1 2 3
     0      CANCEL
```

# ELECTRONIC INDENTIFICATION SYSTEM HAVING REMOTE AUTOMATIC RESPONSE CAPABILITY AND AUTOMATIC IDENTIFICATION METHOD THEREOF

This application is a division of application Ser. No. 08/081,307, filed Jun. 24, 1993, now U.S. Pat. No. 5,475,377.

TECHNICAL FIELD

The present invention relates to an electronic identification system having remote automatic response capability and an identification method thereof, and more particularly, to an electronic identification system having remote automatic response capability and an identification method thereof in which an identification control apparatus remotely calls and responds to a portable electronic apparatus to perform self-identification between the identification control apparatus and the portable electronic apparatus and to thereby automatically control a piece of equipment to be controlled, so as to be widely used with any individual identification apparatus and to have an excellent security feature.

BACKGROUND ART

Recently, along with developments in electronics technology, electronic identification apparatuses for personal use have been rapidly developed. A personal identification apparatus is conventionally applied to a wide range of fields, including doors, vehicular starters, personal computers and safes, as well as for use with prepaid card systems such as public telephones, parking lots and highway toll gates. The fields of application are continuously expanding at an increased rate.

Various types of the conventional individual identification apparatus can be classified according to the inputting method of their identification (ID) codes, i.e., push-button, card-insertion, fingerprint ID, speech-recognition, etc. Among these, the push-button type has been most widely used, in which a user memorizes a secret access number and inputs the number into a system by pressing keys. This method has recently developed further, in connection with a wireless method. On the other hand, the card-insertion type utilizes a magnetic strip card, a punched card or an electronic card containing an integrated circuit (called an "IC card"), which is inserted into a card reader as the method for ID code input. In current systems however, the magnetic strip card system has been supplanted by that using IC cards, and accordingly, a multi-functional IC card system is being pursued. (Though fingerprint ID and speech-recognition type systems have been recently introduced, they have certain problems in view of the real-time processing of fingerprints and speech, as well as low reliability and an impractical cost to the consumer, so wide distribution of these has not yet been made possible.)

With the conventional push-button system, the user need only to memorize an access number and does not run the risk of losing a key, card, etc. However, with increasing incorporation of more identification systems, more ID numbers become necessary, and thus users are burdened with learning numerous access numbers. Also, operating the identification apparatus requires the cumbersome pressing of buttons to input the access code. Moreover, since the keypad is apt to be in sight of a third party when operating the buttons, an inherent fallacy exists in view of security and safety.

In the conventional card-insertion system, memorization of the access number is unnecessary. However, as with the push-button system, every time the identification apparatus is to be operated, the card must be inserted into the card reader, and if the user misplaces the card, unauthorized third-party usage is impossible to prevent. Accordingly, here too is an inherent fallacy, resulting in lowered security and safety. As for the IC card system, the issuance of the IC card itself is difficult because issued cards should be monitored, so its usage has been limited.

In each case other than the speech recognition system, the above-described conventional identification apparatus systems require manual manipulation by the user for operation, and thus when both hands are busy, a user is incapable of inputting the necessary information. Also, the conventional systems are specified according to the field of use and the entry method, so that their widespread usage is limited, i.e., in the home, at the office, outdoors, on the road, etc. Additionally, an integration-control method of all these identification systems is impossible in certain geographical areas. Now, as current trends in self-service automation (vending machines, automatic toll booths, self-service sales counters and parking lots, etc. ) are proceeding at an accelerated rate in the every field of industry and home life, the necessity for an integrated identification system is becoming increasingly obvious.

DISCLOSURE OF THE INVENTION

Therefore, to solve the above problems, it is an object of the present invention to provide an electronic identification system having remote automatic response capability for which a master key method is applied so as to be capable of integrated control of various types of individual identification apparatuses.

It is another object of the present invention to provide an electronic identification system having remote automatic response capability in which both of a user's hands are free, even when identification is carried out, by way of a remote automatic response.

It is still another object of the present invention to provide an electronic identification system having remote automatic response capability in which labor costs can be saved by facilitating the system's registration and administration procedures.

It is yet another object of the present invention to provide an electronic identification system having remote automatic response capability in which security and safety are very high.

It is yet still another object of the present invention to provide an electronic identification system having remote automatic response capability in which the system discriminately operates according to various levels of user access.

It is a further object of the present invention to provide an electronic identification system having remote automatic response capability for controlling the status of passage.

It is still a further object of the present invention to provide an electronic identification system having remote automatic response capability to which a pre-paying method can be adapted.

It is yet a further object of the present invention to provide an electronic identification system having remote automatic response capability in which a paid attendance can be automatically controlled.

It is still yet a further object of the present invention to provide an electronic identification system having remote automatic response capability for use in automatically controlling a toll gate.

It is still another object of the present invention to provide an electronic identification system having remote automatic response capability for use in connection with automatic bank deposit and withdrawal transactions.

To accomplish the above objects of the present invention, there is provided an electronic identification system having remote automatic response capability, comprising: at least one portable electronic apparatus enabled by a user's password input, which, if a specific code loaded on a received call signal matches one of a plurality of specific codes registered in a first memory, loads a user access code corresponding to the matched specific code onto an identification signal and transmits the access-code-loaded identification signal; and at least one automatic identification control apparatus which, if access of a user in possession of the portable electronic apparatus is detected, transmits the specific-code-loaded call signal and receives the user-access-code-loaded identification signal which is generated in response to the call signal, and which, if the user access code loaded on the identification signal matches one of a plurality of user access codes registered in a second memory, then operates a piece of equipment to be controlled, thereby resulting in that the automatic identification control apparatus having a plurality of registered specific codes, one of which corresponds to the enabled portable electronic apparatus, performs a call and identification operation according to access requests of the portable-electronic-apparatus-possessing user.

Here, the portable electronic apparatus comprises memory means for storing specific codes assigned to at least one automatic identification apparatus, a user access code and password, a receiver for receiving a wireless call signal, a transmitter for transmitting a wireless identification signal, and control means for generating the identification signal based on the user access code and password, if a specific code received in response to the call signal matches one of a plurality of specific codes registered in the memory means.

The automatic identification apparatus comprises memory means for storing user access codes assigned to at least one portable electronic apparatus, specific codes and a user's password, a detector for detecting the approach of a mobile object in possession of a portable electronic apparatus, a transmitter for transmitting a wireless call signal, a receiver for receiving a wireless identification signal, and control means for generating the call signal based on the specific code in response to the detection signal, and for generating a control signal if a user access code received in response to the identification signal matches one of a plurality of user access codes registered in the memory means.

Thus, using the system of the present invention, if the mobile object having the portable electronic apparatus is accessed to the automatic identification apparatus, since an automatic identification operation is performed by the automatic identification apparatus which mutually responds with the portable electronic apparatus, both hands of the user are free.

The system of the present invention can embody a prepaying system by storing data corresponding to an amount of prepaid money into the memory means of the portable electronic apparatus, subtracting cost data calculated and transmitted by the automatic identification apparatus from the stored data, and updating that data with the subtracted result which becomes the new amount of prepaid money. Thus, all the identification systems can be integrated, and controlled with a single portable electronic apparatus. That is, the user's secret access codes are registered in his household's electronic opening and closing apparatus, the start-up devices of various electronic products (e.g., personal computer, etc.), the door locks of his vehicle, fee-levying control apparatuses adapted to toll gates for highways, bridges, tunnels, etc., parking lots, and the paid attendance control apparatuses of cafeterias, movie theaters, etc. Here, individual fees and the specific codes of the corresponding automatic identification control apparatuses are registered in the portable electronic apparatus, enabling fully integrated application. Also, the system of the present invention simultaneously makes inquiries as to the credit status of the user, and if the control apparatus is connected with a bank's on-line computer or that of a credit card company, automatic cash and credit purchases and an automated bank deposit-and-withdrawal transaction system are thus enabled.

There is also provided an automatic identification control method for an electronic identification system having remote automatic response capability comprising the steps of: (1) transmitting a call signal on which a specific code is loaded in response to an initial enable signal; (2) transmitting an identification signal on which a user access code corresponding to the specific code is loaded, if the specific code detected via the call signal matches one of a previously registered, plurality of first specific codes; (3) determining whether a user access code detected via the identification signal matches one of a previously registered, plurality of second specific codes; and (4) transmitting and receiving an instruction and data, after mutual identification by way of steps (1), (2) and (3).

BRIEF DESCRIPTION OF THE DRAWINGS

FIG. 2A through 2E are views showing various embodiments of the portable electronic apparatus shown in FIG. 1.

FIGS. 3A and 3B are diagrams for explaining signal formats of call and identification signals used in connection with FIG. 1.

FIG. 4 is a diagram showing a key matrix of the input means of FIG. 1.

FIG. 5 is a view showing a memory map for a storage means in the portable electronic apparatus of FIG. 1.

FIG. 6 is a view showing a memory map for a storage means in the automatic identification control apparatus of FIG. 1.

FIG. 15 is a view for explaining a passage restriction relationship according to access level assignment, which is applied to the automatic identification door opening/closing device of the present invention.

FIG. 16 is a block diagram of the automatic identification door opening/closing device having a passage control function of the present invention.

FIG. 17 is a view showing an example of the attendance record table output from the printer of FIG. 16.

FIGS. 29A through 29F are diagrams which show various display states of the CRT of FIGS. 27A and 27B.

BEST MODE FOR CARRYING OUT THE INVENTION

The preferred embodiments of the present invention will be described below in more detail with reference to the accompanying drawings.

Figure 1:
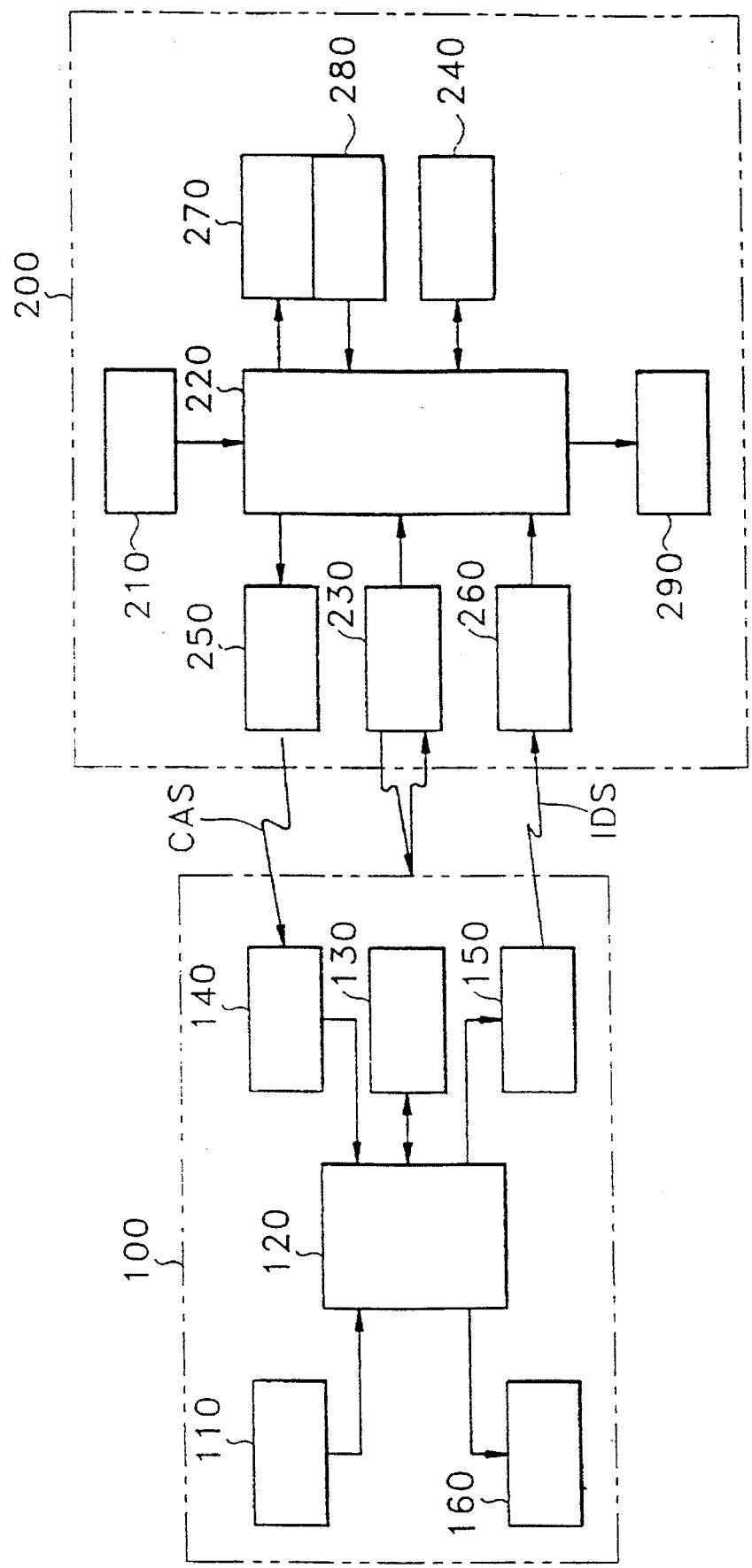
FIG. 1 is a block diagram of an electronic identification system having remote automatic response capability according to the present invention.

FIG. 1 is a block diagram of an electronic identification system having remote automatic response capability according to the present invention. In FIG. 1, a portable electronic apparatus 100 comprises input means 110, control means 120, storage means 130, receiving means 140, transmitting means 150 and display means 160. Automatic identification control apparatus 200 comprises input means 210, control means 220, enable means 230, transmitting means 250, receiving means 260, drive means 270, operation detecting means 280 and alarm means 290.

Input means 110 of portable electronic apparatus 100 comprises a key matrix circuit for performing user password and mode selection, and power-on and power-off functions.

Control means 120 comprises a microcomputer, a control program ROM, a SRAM and DRAM for data storage, a clock generator circuit and a piezoelectric device for generating an audible alarm signal.

Storage device 130 comprises a non-volatile memory, that is, a EEPROM for storing the user's password and access code, specific codes pertaining to the particular automatic identification control apparatus' registration, and other data.

Receiving means 140 comprises a radio demodulation circuit or a light-receiving circuit for receiving a modulated RF or IR call signal, and detecting the specific codes and data loaded on the call signal, which are transmitted from the automatic identification control apparatus.

Transmitting means 150 comprises a radio modulation circuit or a light-modulating circuit for modulating the user's access code and specific data, and transmitting an identification signal.

Display means 160 comprises a display device (LCD, LED, etc.) and the LCD or LED driver, for displaying data according to the key operation of input means 110, and data or an operating state according to the processing results of control means 120.

Portable electronic apparatus 100 may comprise an IC card interface circuit for bi-directionally communicating with the existing IC card, and may also comprise an input and output interface circuit for bi-directional communication with a personal computer. Here, portable electronic apparatus 100 further comprises a primary or secondary battery cell and a power supply check circuit therefor; these however are not shown in FIG. 1.

Figure 2C:
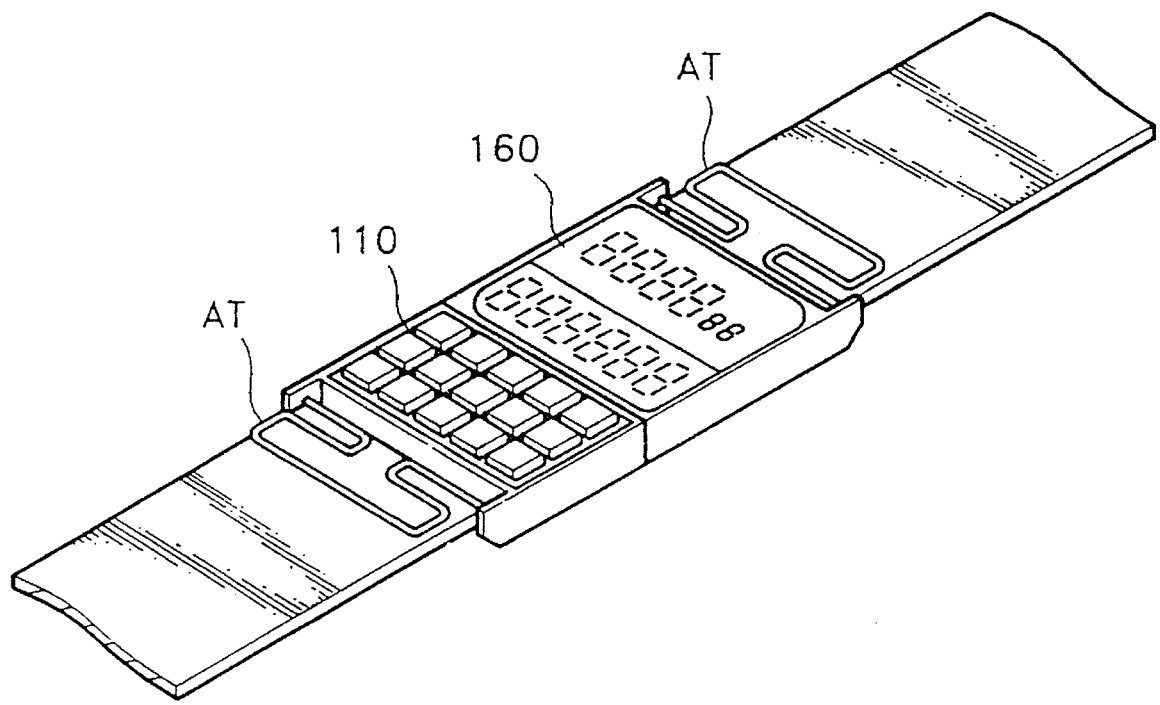
Figure 2D:
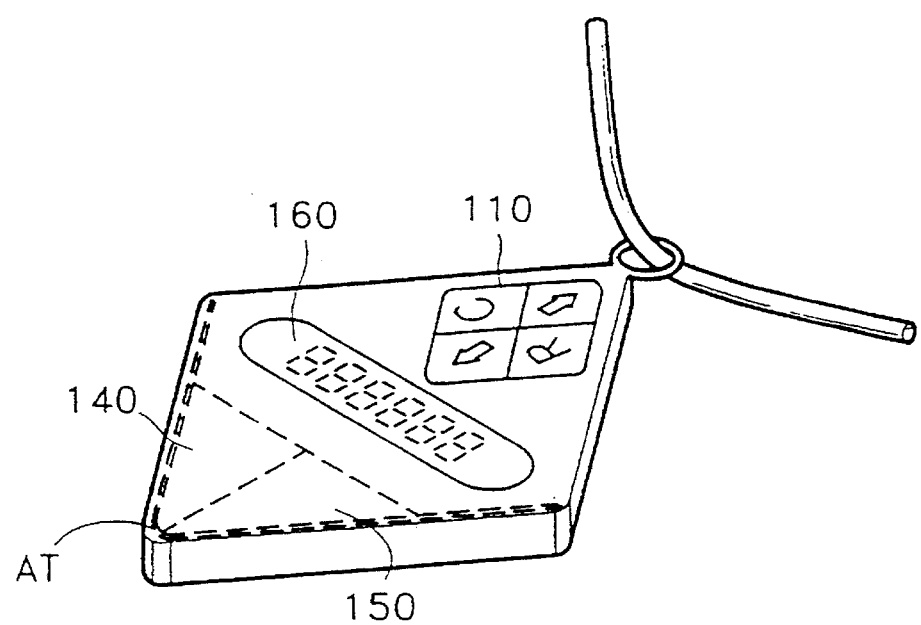

Portable electronic apparatus 100 may be in the form of a ball-point pen (FIG. 2A) for convenient carrying, a business-card-sized card (FIG. 2B), a wristwatch (FIG. 2C), a jewelry item, e.g., pendant (FIG. 2D), stickpin or broach, or a belt buckle (FIG. 2E). To facilitate miniaturization of such a portable electronic apparatus, that is, in the case of the ball-point pen, necklace or belt buckle, only four input keys are necessary. Here, when an UP (U or ↑) or DOWN (D or ↓) key are pressed, an LCD panel scrolls through figures and/or characters, and a set key is pressed when the desired display appears, thus selecting an input. (If wrongly set, a cancel key is pressed.) When all the desired data has been input, a registration key is pressed, to thereby lock-in the displayed input data for transmission to the internal control means.

As shown in FIG. 2B, portable electronic apparatus 100 can have a function select switch for various modes: electronic calculator (CAL), clock (OFF) and identification (ID). Also possible but not depicted, portable electronic apparatus 100 may be connected with a beeper, cellular phone or miniature FM receiver.

Input means 210 of automatic identification control apparatus 200 comprises a key matrix circuit having digit keys and various mode keys.

Control means 220 comprises a microcomputer, a control program ROM, an SRAM and DRAM for data storage, a clock generator circuit and a piezoelectric device.

Detection means 230 comprises a detecting circuit having a proximity sensor such as an infrared light sensor or a supersonic wave sensor for detecting the approach of a mobile object carrying portable electronic apparatus 100, for example, a human being or automobile.

Storage means 240 comprises a non-volatile memory, that is, an EEPROM for storing the administrator's password and specific codes, user registration codes, and other data.

Transmitting means 250 comprises a radio modulation circuit or a light-modulating circuit for modulating a specific code and data, and transmitting the modulated signal as a call signal.

Receiving means 260 comprises a radio demodulation circuit or a light-receiving circuit for receiving a modulated RF or IR identification signal, and detecting the user's access code and specific data.

Driver means 270 comprises a driver circuit or driving the equipment to be operated in response to a control signal which is generated when user access codes are received by control means 220 and match a registered user's code.

Operation detection means 280 is connected with driver means 270 or directly to the equipment to be operated, and comprises an operation detection circuit for detecting the operating state of the driven or operated equipment.

Alarm means 290 comprises an alarm generating circuit and a misoperation indicating circuit for generating an audible and/or visible alarm to signal the improper operation of the equipment to be operated or the access of an unregistered (unauthorized) mobile object.

Automatic identification control apparatus 200 is connected with predetermined equipment to be operated according to installation locations. For example, for installation at a main entrance, automatic identification control apparatus 200 is linked with an opening and closing mechanism and an intercom, and for use with an electronic product, say, a computer, it is tied to a lock-out or start-up device. Further, if automatic identification control apparatus 200 is to be used in conjunction with a paid attendance control system (cafeteria, movie theater, etc.), it may be interfaced with a turnstile. Other interconnection examples include that for toll gate systems, e.g., toll roads, tunnels, bridges, etc.

Automatic identification control apparatus 200 can also be connected with a camcorder, to photograph vehicles and their passengers.

Also, automatic identification control apparatus 200 comprises a display means (e.g., LCD, LED, etc.) to display data and operation state, or comprises an I/O interface means to enable bi-directional communication with a computer. Also, to miniaturize the portable electronic apparatus according to the present invention, the input means of the portable electronic apparatus can be omitted. Instead, the necessary information can be input via the input means of the automatic identification apparatus, to then write the necessary information to the portable electronic apparatus via the transmitting and receiving means.

FIGS. 3A and 3B show the structures of a call signal CAS and an identification signal IDS, respectively. Call signal CAS is a signal obtained from the modulation (RF or IR) of start signal ST, a specific code XC, user secret code USC, data DT, and an end-of-data signal ED. Similarly, identification signal IDS is a signal obtained from the modulation (RF or IR) of start signal ST, user secret code USC, address ADD, data DT, and an end-of-data signal ED. Here, the CAS and IDS signals may be encoded and error-correction-encoded during transmission, and decoded and error-correction-decoded during reception, via well-known methods.

In RF-transmitting and RF-receiving the above call and identification signals, a subcarrier frequency on the order of hundreds of megahertz is used, in consideration of the miniaturization of portable electronic apparatus 100. For this purpose, internal transmission and reception loop antennas are desirable and formed of copper film on printed circuit board. When these signals are communicated via light transmitting and receiving apparatuses, a light modulation method for driving a light-emitting device can be used, in which the switching of a 40–50 KHz oscillator is performed according to a data train.

The registration procedure of the specific codes and the user's secret access code (USC) adapted in the electronic identification system having remote automatic response capability according to the present invention as described above will be described below with reference to FIGS. 4 through 7.

Figure 7:
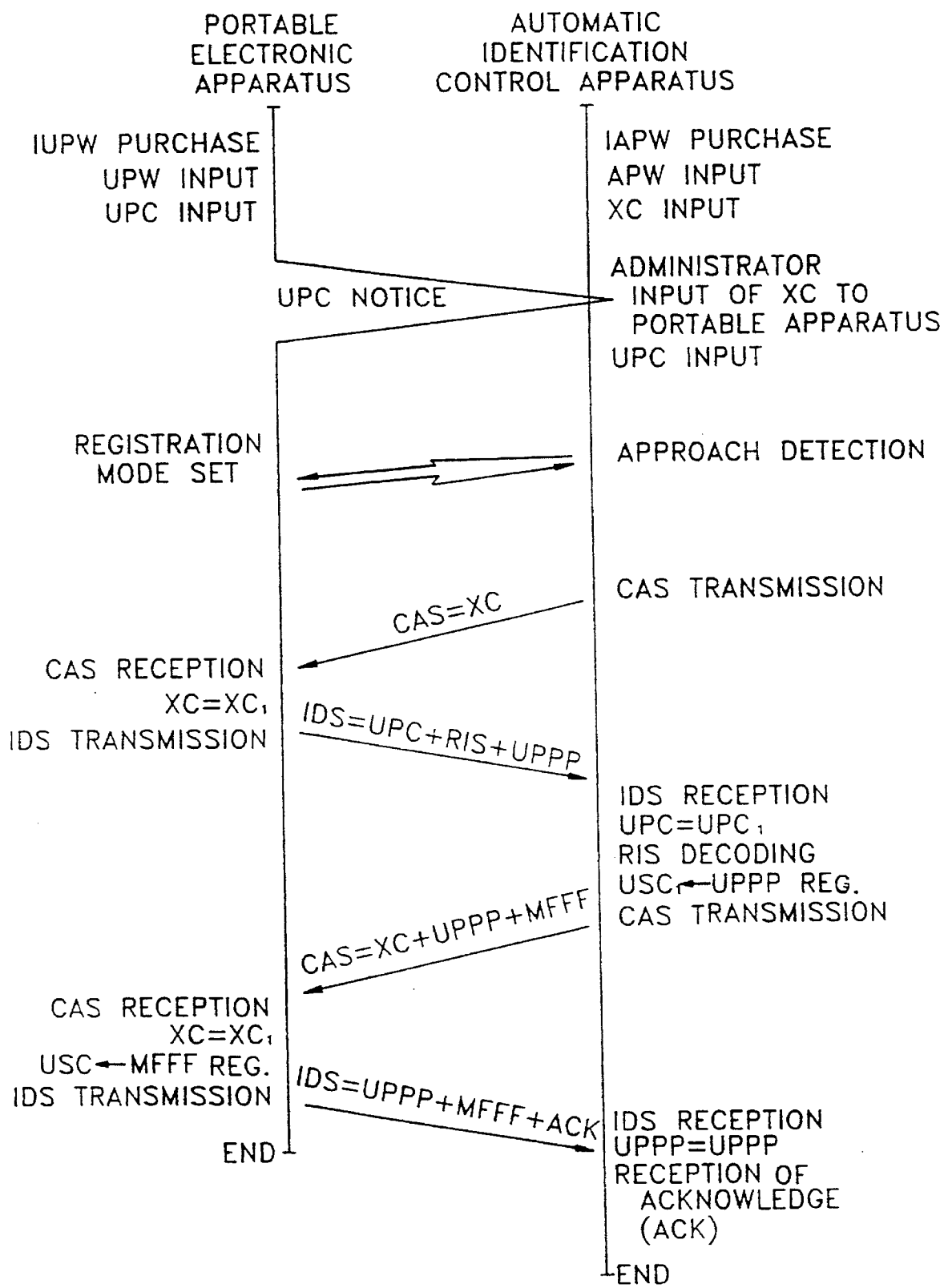
FIG. 7 is a flowchart diagram for explaining the mutual registration procedure of the system according to the present invention.

As shown in FIG. 7, a user possessing portable electronic apparatus 100 of the present invention inputs a manufacturer- or dealer-determined initial user password IUPW through input means 110 having key input means shown in FIG. 4 or FIGS. 2A–2E. Then, control means 120 of portable electronic apparatus 100 compares the input IUPW data with the previously stored IUPW data in a memory region of storage means 130 shown in FIG. 5, and if they match, an "enable" indication appears on display means 160. The user then inputs his own personal password UPW data through input means 110. Subsequently, when an "UPDATE" key is pressed, control means 120 deletes the IUPW data stored in a first memory region 131 of storage means 130 and writes the UPW data therein. When the user inputs his personal identification UPC data (e.g., ID number, vehicle number, bank account number, health card number, etc.), and then presses a "REGISTRATION" key, control means 120 sequentially writes the user's UPC data in a second memory region 132 of storage means 130. Here, the user can cancel the input data by pressing a "CANCEL" key prior to pressing the "UPDATE" or "REGISTRATION" keys during the UPW-updating or UPC-writing procedure.

On the other hand, also shown in FIG. 7, in a similar method to that of portable electronic apparatus 100, the system administrator, being in possession of automatic identification control apparatus 200 of the present invention, inputs the administrator's password data APW and specific code data XC using an initial administrator's password IAPW, in a first memory region 241 and a second memory region 242 of storage means 240, as shown in FIG. 6. If the user presents portable electronic apparatus 100 to the administrator after inputting his password, i.e., enabled, and informs the administrator of the necessary UPC data, the administrator inputs XC data identical to that written in automatic identification control apparatus 200 through input means 110, and presses a "REGISTRATION" key. Then, control means 120 of portable electronic apparatus 100 writes the input specific code data $XC_1$ in an address UPPP of a third memory region 133 in storage means 130. Also, the administrator inputs the user-supplied UPC data through input means 210 of automatic identification control apparatus 200, and presses the "REGISTRATION" key. Then, control means 220 of automatic identification control apparatus 200 writes the input personal identification data $UPC_1$ in an address MGGG of a third memory region 243 in storage means 240. After completion of the above operation, and the administrator has returned the XC-data-written portable electronic apparatus 100, the user presses the "REGISTRATION" key and sets a registration mode. Then, if the user takes a thus-set portable electronic apparatus 100 and approaches automatic identification control apparatus 200, the identification control apparatus detects the user's approach through detection means 230, and transmits a first call signal CAS through transmitting means 250. Control means 120 of portable electronic apparatus 100 compares the detected XC data from first call signal CAS received through receiving means 140 with the written XC data. If the detected XC matches the written XC, corresponding UPC data is read out from storage means 130, to be transmitted with a registration instruction signal RIS and the address data UPPP of $XC_1$ as a first identification signal IDS via transmitting means 150. Control means 220 of automatic identification control apparatus 200 compares the detected UPC data from first identification signal IDS received through receiving means 260 with the written UPC data. If the detected UPC matches the written UPC, the registration instruction signal (RIS) is decoded, and the received UPPP data is written in an address MFFF of third memory region 243 in storage means 240 in connection with address MGGG where the UPC data is stored. By doing so, the user's secret code USC is registered, thereby transmitting the XC, UPPP and MFFF data as second call signal CAS via transmitting means 250. Control means 120 of portable electronic apparatus 100 reads out the $XC_1$ data located in address UPPP of storage means 130, using the UPPP data detected from second call signal CAS received through receiving means 140. Here, if the read $XC_1$ matches the received XC, the received MFFF data is written as the user's secret access code $USC_1$ in address UPPP+XXX of a fourth memory region 134 of storage means 130. Accordingly, registration of a user's secret code USC (access code) and his specific code XC is accomplished. Then, a second identification signal, that is, IDS=UPPP+MFFF+ reception confirmation signal (ACK), is transmitted through transmitting means 150 and the program terminates. Automatic identification control apparatus 200 receives the second identification signal and confirms if the registration procedure is accomplished, which also terminates the program.

As described above, in the present invention, portable electronic apparatus 100 is mutually communicated with automatic identification apparatus 200, and in so doing, registration of both the final specific code (XC) and the user's secret access code (USC) is performed. Therefore, a user cannot recognize specific codes of the control apparatus, nor can an administrator recognize the secret user-access codes. Thus, fraud on the part of the user or the administrator can be prevented to guarantee security and safety.

Also, the corresponding memory region is directly addressed by the received address information, without the need for searching specific codes or user access codes, due to registration of both the portable electronic apparatus numbers and the automatic identification control apparatus numbers. Accordingly, real-time processing can be performed without slowing the memory access time.

Operation of the present invention in which the specific code and the user's secret access code are registered as described above, will be described below by way of various embodiments.

DOOR LOCK SYSTEM

Figure 8:
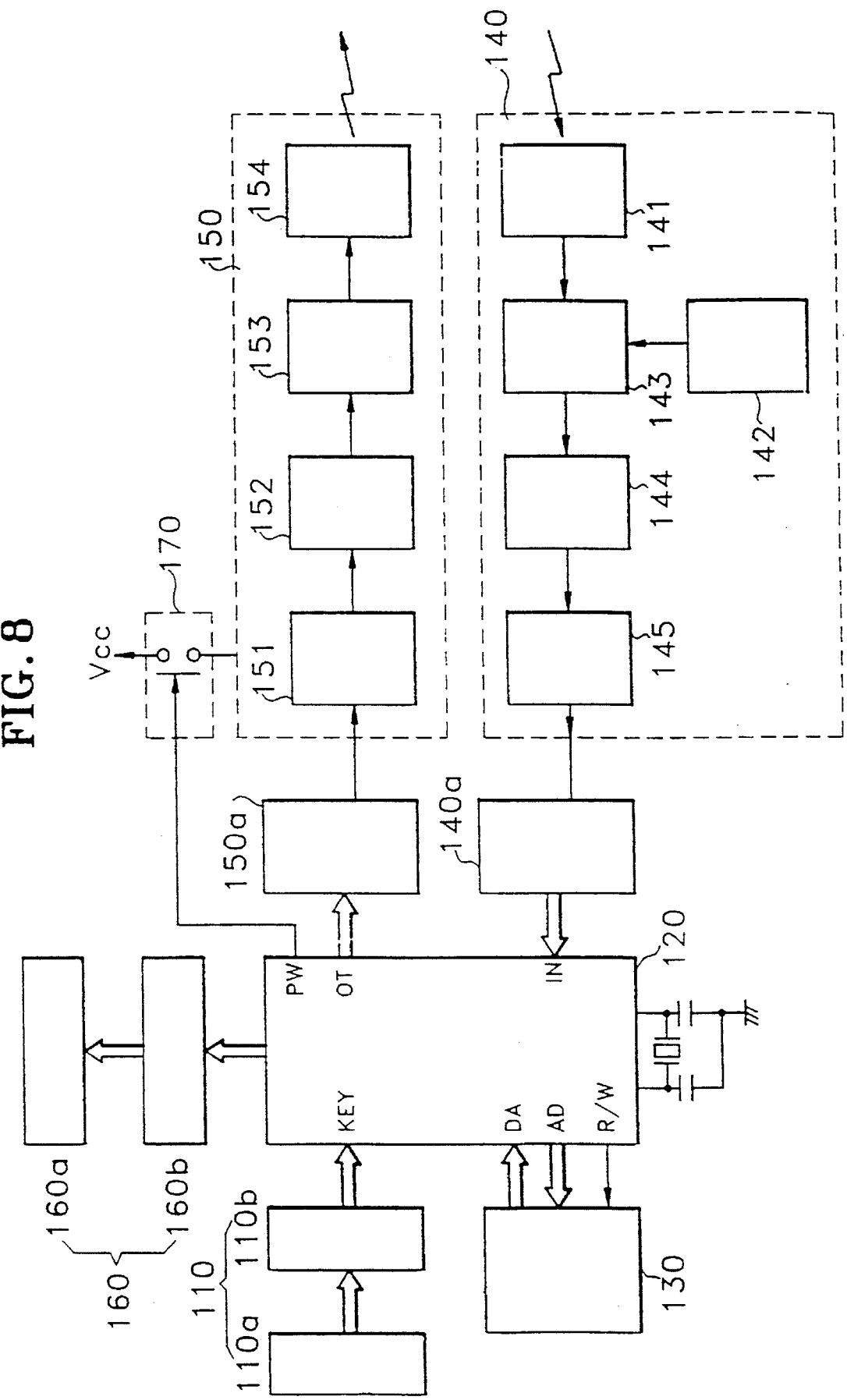
FIG. 8 is a block diagram of one embodiment of the portable electronic apparatus of FIG. 1.

Referring to FIG. 8, one embodiment of portable master key 100 according to the present invention comprises: input means 110 having key matrix 110a and interface circuit 110b; control means 120 composed of a microcomputer; storage means 130 composed of a non-volatile memory such as a EEPROM; receiving means 140 having a high frequency amplifier 141, a local oscillator 142, a frequency converter 143, an FM discriminator and filter portion 144, and an inverting amplifier 145; transmitting means 150 having a high frequency oscillator 151, an oscillator 152, an FM modulator 153 and an intermediate frequency amplifier 154; and display means 160 having a liquid crystal display 160a and an interface circuit 160b.

Receiving and transmitting means 140 and 150 comprise a serial-to-parallel converter 140a for serially receiving the specific code data detected from the call signal which has been received and amplified and converting the serial data into parallel data to supply it to microcomputer 120, a parallel-to-serial converter 150a for receiving in parallel the user's secret code data and instruction data output from microcomputer 120 and converting the parallel data into the serial data to supply it to transmitting means 150, and switching means 170 for performing a switching so that power supply voltage Vcc of a battery cell is supplied to transmitting and receiving means 140 and 150 in response to power supply control signal PW of microcomputer 120. The user's secret code, the user's password, and the specific code and the instruction code of the automatic identification door opening and closing device are stored in the EEPROM being storage means 130. Serial-to-parallel converter 140a and parallel-to-serial converter 150a may be composed of one common serial-to-parallel converter in which the input and output are reversed and controlled according to the states of reception and transmission. Transmitting and receiving means 140 and 150 may adopt a known FM-receiving circuit having a 300–900 MHz subcarrier. Display means 160 displays the input state of input means 110 on an LCD panel or the operating state of the opening and closing mechanism performing transmission and reception response using the call signal and the identification signal.

Figure 9:
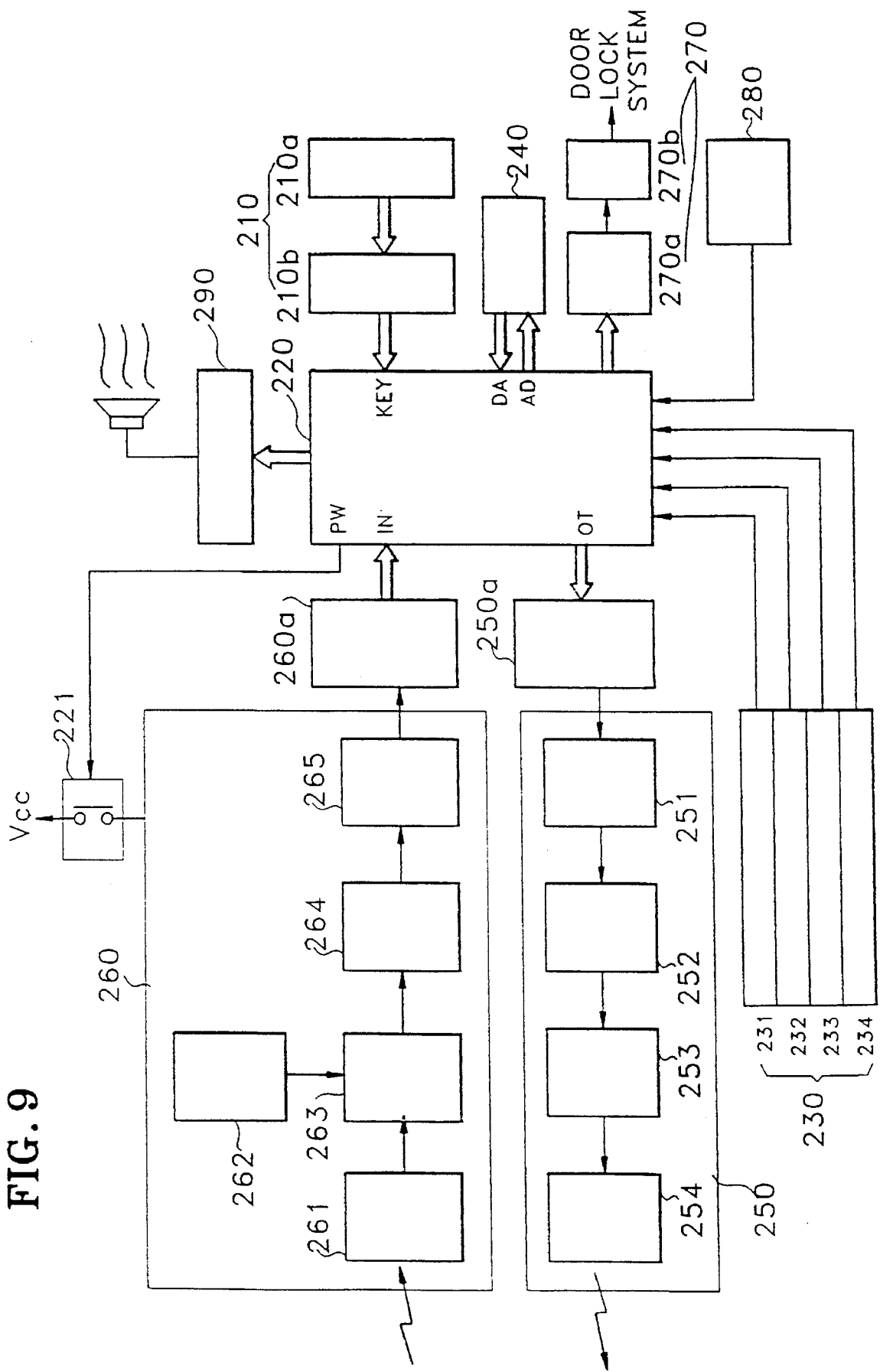
FIG. 9 is a block diagram of one embodiment of the automatic identification door opening/closing device according to FIG. 1.

Referring to FIG. 9, one embodiment of automatic identification door opening/closing device 200 according to the present invention comprises input means 210 having a key matrix 210a and an interface circuit 210b; control means 220 composed of a microcomputer which can function as a clock; detection means 230 having first and second external sensors 231 and 232 and first and second internal sensors 233 and 234 for sensing the approach of a mobile object; storage means 240 composed of a non-volatile memory such as a EEPROM: transmitting means 250 having a high frequency oscillator 251, an oscillator 252, an FM modulator 253, and an intermediate frequency amplifier 254 for transmitting a call signal; receiving means 260 having a high frequency amplifier 261, a local oscillator 262, a frequency converter 263, an FM discriminator and filter portion 264, and an inverting amplifier 265 for receiving the instruction signal, equipment to be operated 270 having an interface circuit 270a and an driver circuit 270b; and alarm means 290 having an alarm circuit and speaker.

The embodiment of automatic identification door opening/closing device 200 according to the present invention also comprises a system enable switch 221, a serial-to-parallel converter 260a, a parallel-to-serial converter 250a, and operation detection means 280.

Detection means 230 detects the approach of a mobile object and supplies a system enable signal to microcomputer 220 which thereby generates a power supply control signal PW to turn on switch 221. Accordingly, power supply voltage Vcc is supplied to transmitting and receiving means 250 and 260. Transmitting and receiving means 250 and 260 are connected with microcomputer 220 through serial-to-parallel converters 250a and 260a.

Storage means 240 composed of the EEPROM stores the user access code of at least one portable master key, the specific code, the administrator's password, and data establishing the in and out times of persons. Driver circuit 270b conventionally drives a solenoid and electronically controls the opening and closing operation for the door. Also, a motor driver circuit may be adapted as driver circuit 270b, for controlling the opening and closing of the door via a motor. Operation detection means 280 monitors the opening and closing state of the door to supply the detected state to microcomputer 220. Here, a switching state detection circuit by which the switching of a solenoid is sensed to thereby detect an operating current/voltage change in the solenoid, may be used as the operation detection means.

Figure 10:
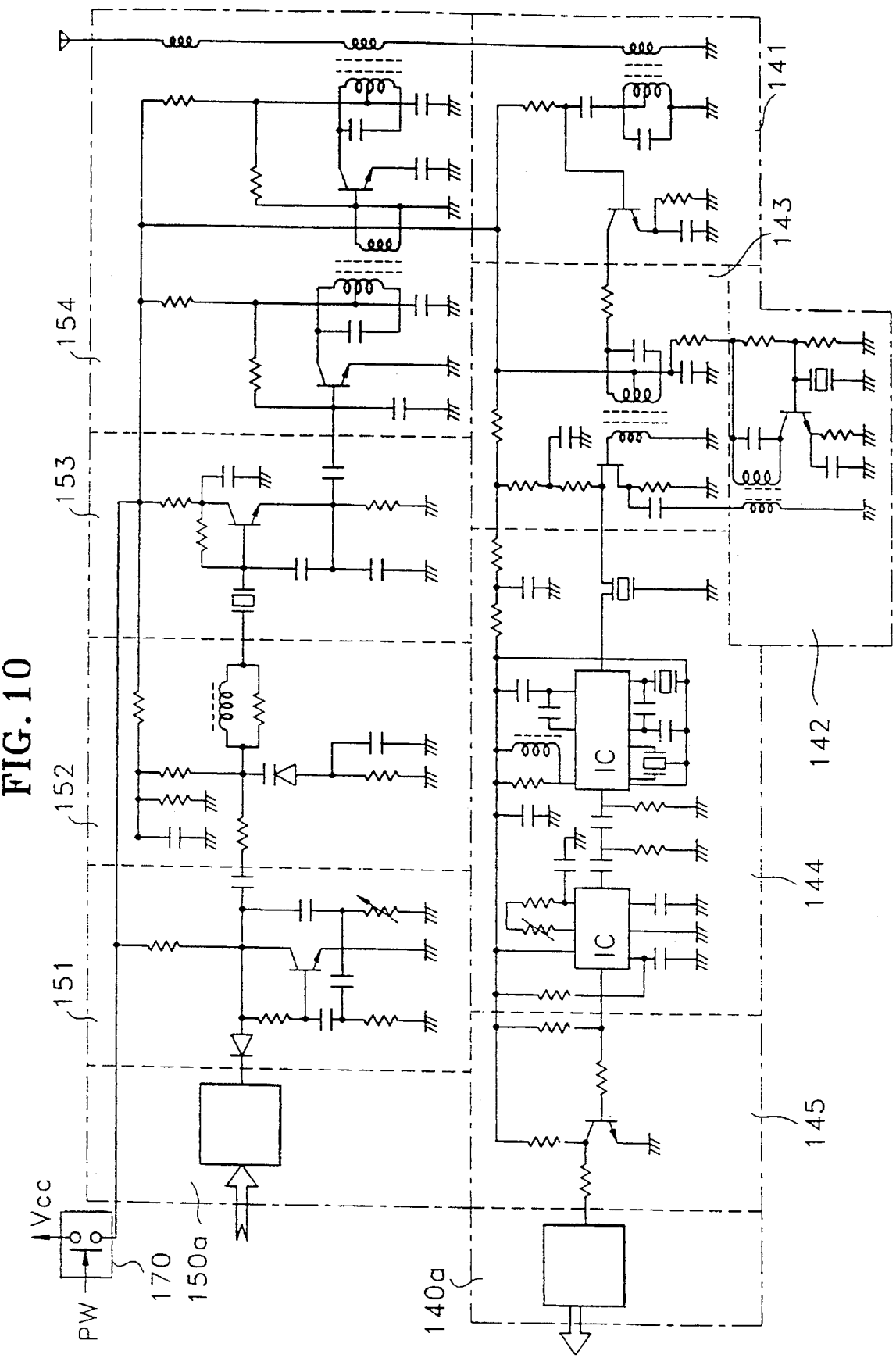
FIG. 10 is a circuit diagram of the transmitter/receiver shown in FIGS. 8 and 9.

FIG. 10 shows one embodiment of the FM transmitting and receiving circuit of FIGS. 8 and 9, which is well-known. Thus, explanation of its detailed construction and operation will be omitted.

Figure 11:
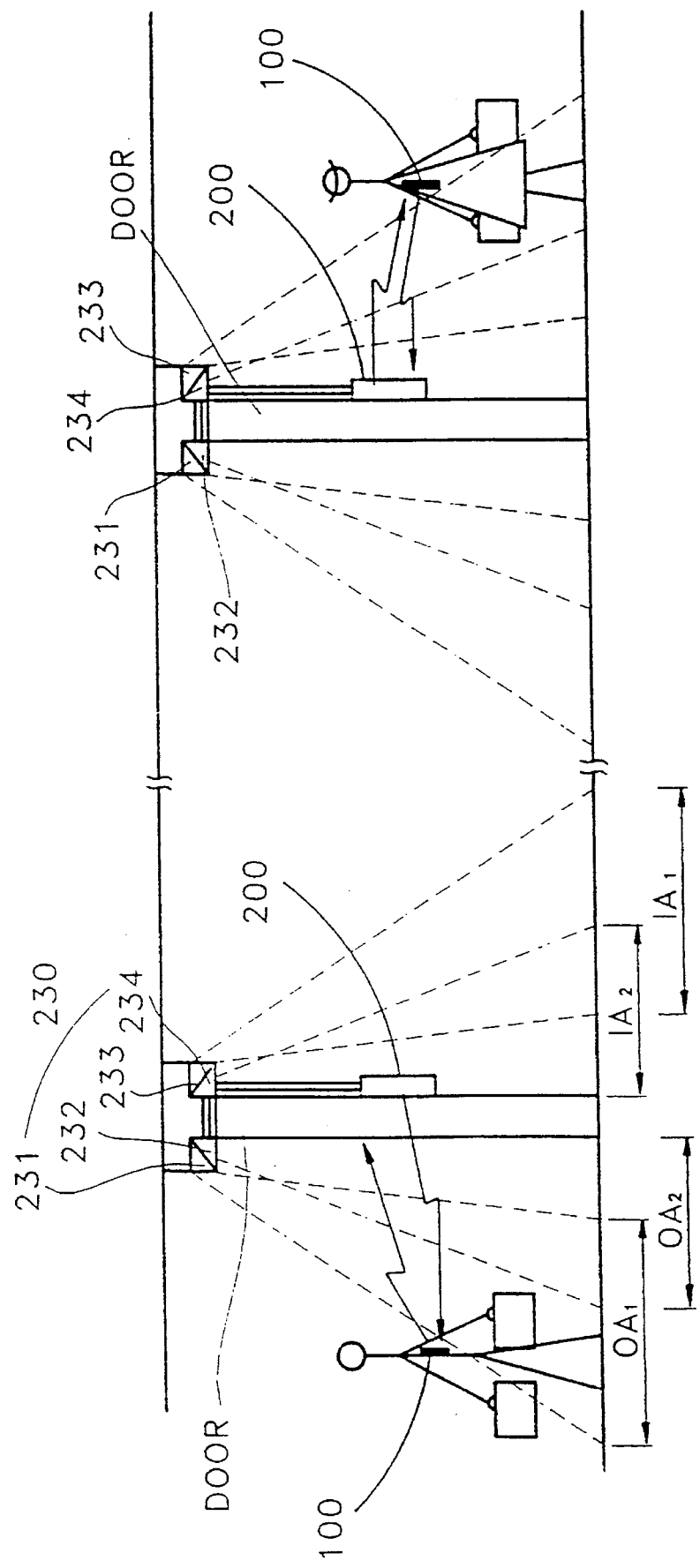
FIG. 11 is a view for explaining the detector of FIG. 9.

FIG. 11 shows one embodiment of detection means 230 adapted in the present invention. First and second outer detection areas $OA_1$ and $OA_2$ of first and second external sensors 231 and 232 for detecting the approach and presence of persons wishing to gain entry, as well as first and second inner detection areas $IA_1$ and $IA_2$ corresponding to first and second internal sensors 233 and 234 for the likewise detection of an exiting person, are established as shown in the drawing. Thus, the approaching subject, while in possession of a portable master key, desires entry through the door, his access status is first detected by first external sensor 231 and then by second external sensor 232, thereby determining access status. First and second internal sensors 233 and 234 operate similarly for exiting from the inner areas.

Operation of the present invention as described above will be described below with reference to FIGS. 1, 8 and 9.

First of all, the combination of a user's secret access code and a specific code supplied by the manufacturer or dealer is assigned to portable master key 100 and automatic identification door opening/closing device 200. That is, both the access code of the bearer of portable master key 100 and the specific code of the door to be accessed are written in the portable master key, while respective user access codes of all those permitted access are written in automatic identification door opening/closing device 200. When the user inputs his password through input means 110, control means 120 compares the input password with the stored password and determines whether they match, if so, the system is enabled. (Thus, even if the portable master key is lost, it is useless unless the password is identified.) In a thus-enabled portable master key, switching means 170 is turned on to supply power to transmitting and receiving means 140 and 150, so that signal transmission and reception is possible. Once portable master key 100 has been enabled, if the user wishes to gain access to the door, his approach is detected by first external sensor 231, which enables the system.

That is, microcomputer 220 turns switch 221 on, to supply the power to transmitting and receiving means 250 and 260. Subsequently, the specific code registered in storage means 240 is read out, and the read parallel data is converted into serial data through parallel-to-serial converter 250a. The serial data is FM-modulated by transmitting means 250 and transmitted as the call signal. In portable master key 100, the call signal received through receiving means 140 is demodulated to detect the serial data. The detected serial data is converted into parallel data via serial-to-parallel converter 140a. Then, the converted parallel data is supplied to microcomputer 120. If a match is found between the input specific code and a stored specific code, microcomputer 120 reads out the user access code and an "open door" instruction code and transmits them as an identification signal via parallel-to-serial converter 150a and transmitting means 150. (Here, automatic identification door opening/closing device 200 compares the user access code input through receiving means 260 and serial-to-parallel converter 260a with a previously stored plurality of user access codes, and when a match is determined, the user is recognized as an authorized person for entry.) After the instruction code is decoded, driver circuit 270b is driven via interface circuit 270a in response to the received signal from second external sensor 232, to drive the necessary mechanism to operate the door (unshown). For example, for an "open door" instruction signal, the solenoid is operated to open the door, and the current time and user identification information are stored in storage means 240, using the internal clock of microcomputer 220. Thereafter, as the user passes through the opened door and enters the region of second internal sensor 234, the door is closed. Operation detection means 280 verifies the closing of the door, and if not completely closed, the alarm is generated via alarm means 290. Thus, after the user passes through the door, the presence or absence of the alarm tells the user whether the door closes. In such a situation, the user can visually and/or manually check for possible obstructions.

Figure 12:
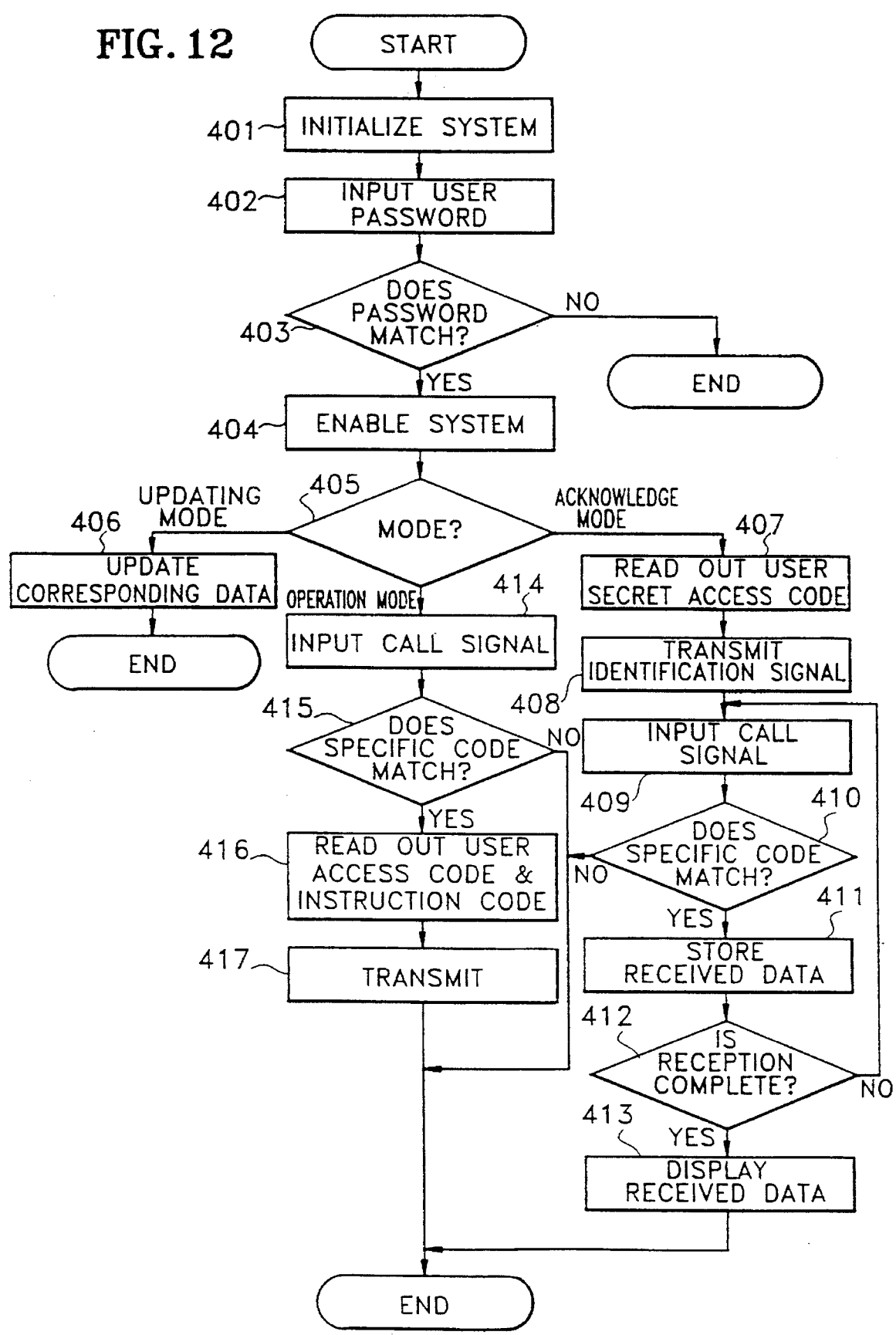
FIG. 12 is a flowchart diagram for explaining a control program for FIG. 8.

FIG. 12 is a flowchart of a control program of one preferred embodiment of a portable master key. Portable master key 100 is initialized when the initial power is applied (step 401). Then, the user's password and instruction are input via input means 110 (step 402). Here, the user's password is set as a four-place figure, and the instruction is set by combination of the function and numeric keys. If the input password matches the stored password (step 403), the system is enabled to allow transmission and reception (step 404). Next, the instruction is decoded and the given mode is discriminated (step 405). If the given mode is an updating mode, updating of the user's password or the data is performed (step 406). If the given mode is an identification mode, the user access code and the instruction code are read out (step 407) to transmit an identification signal (step 408) and receive the call signal (step 409). Then, it is determined whether the specific code matches the stored specific code (step 410), and if so, the received data is stored (step 411). Next, it is checked to determine whether the received data is complete (step 412), and if so, the received data is displayed via display means 160 (step 413). If the given mode is an operational mode the call signal is received (step 414). Thereafter, the received specific code is checked against the previously stored specific code (step 415), and if they match, the user access code and the door opening instruction code is read out (step 416), to transmit an identification signal (step 417). Thus, operation of the system is completed.

Figure 13A:
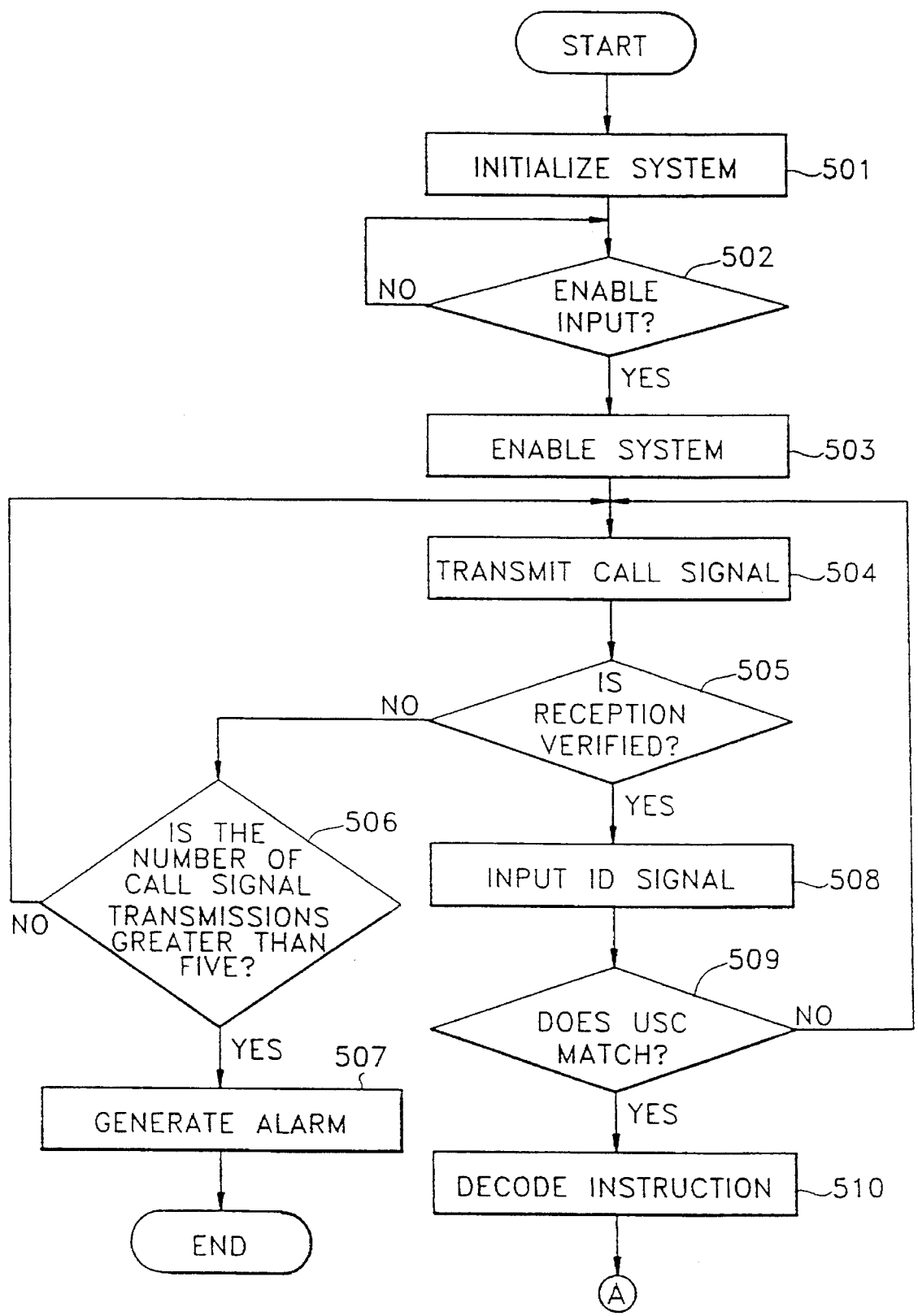
FIGS. 13A–B are a flowchart diagram for explaining a control program for FIG. 9.
Figure 13B:
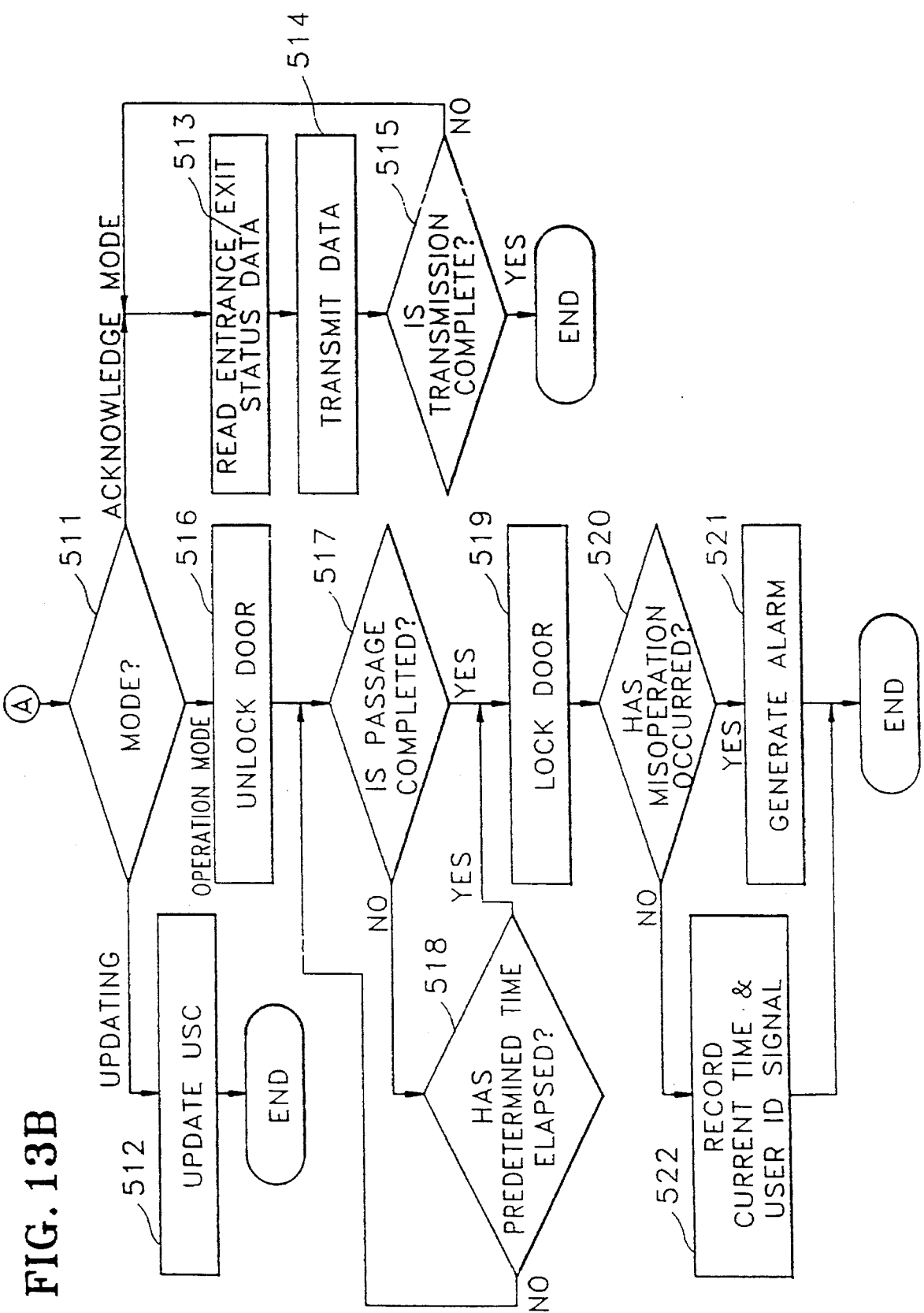

FIG. 13 is a flowchart of one preferred embodiment of an automatic identification door opening/closing device. In FIG. 13, the control program initializes the system when power is initially applied (step 501). Then, approach of a mobile object is detected by the first internal or external sensor (step 502), which enables the system, and in turn enables transmission and reception (step 503). Subsequently, the call signal on which the specific code is loaded is transmitted (step 504), followed by checking the reception of the identification signal (step 505). When no identification signal is received, call signal transmissions are counted (step 506) and if they exceed a predetermined number, say, five, without a response, the alarm signal is generated (step 507), ending the program. If a signal reception in response to the call signal is determined within the predetermined number of times, the identification signal is received (step 508).

Then, it is determined whether the user access code loaded on the identification signal matches the stored user access code (step 509), and if they match, an authorized user is confirmed and the instruction is decoded. A mode is determined according to the decoded instruction (step 511). If the mode is an updating mode, the recorded user access code is updated, becoming a new user access code (step 512). Here, the program terminates. If the mode is an identification mode, the access level data is read out (step 513). Subsequently, the data is transmitted (step 514). It is then checked whether the data transmission is complete (step 515), and if so, the program may terminate here, too. If the mode is an operational mode, the door is unlocked (step 516), and completed passage is verified (step 517). After elapse of a predetermined time (step 518), the door is locked again (step 519). At this time, misoperation is determined, that is, whether the door is completely closed (step 520), and if not, the alarm signal is generated (step 521). When normal operation is verified, the current time and individual identification information is recorded (step 522), which also terminates the program.

Figure 14:
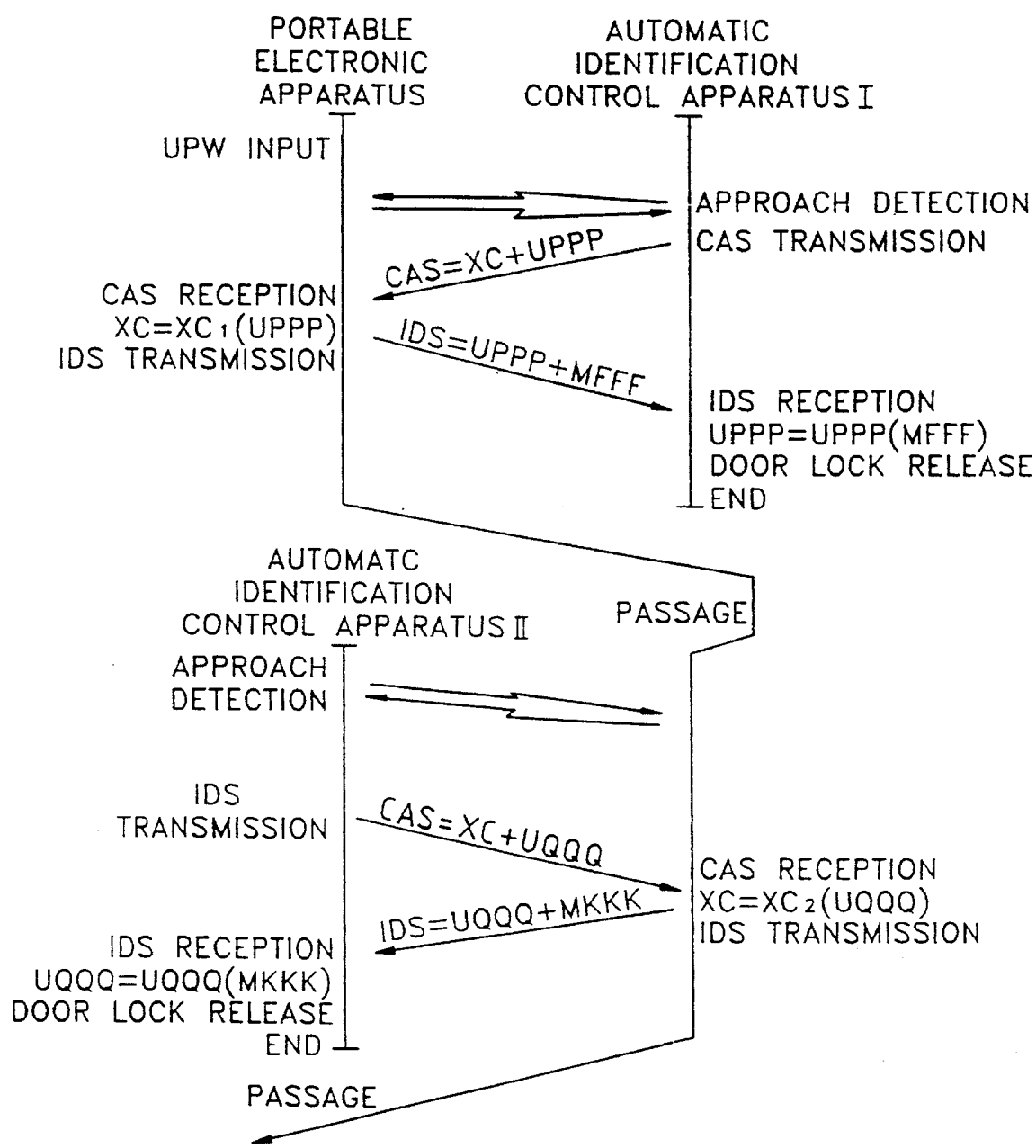
FIG. 14 is an operational mode diagram for explaining a mutual communication procedure between a number of the automatic identification door opening/closing devices and a portable electronic apparatus.

Referring to FIG. 14, a procedure of passing through a plurality of the door lock systems will be explained. In FIG. 14, when the user inputs UPW data containing access level information to portable master key 100, and wishes to gain access to a first automatic identification control apparatus I corresponding to a first door, detection means 230 of first automatic identification control apparatus I detects his approach and transmits the call signal. Portable master key 100 receives the call signal and compares specific code XC with specific code $XC_1$ registered in an address UPPP, and if a match is determined, the identification signal is transmitted. The automatic identification control apparatus receives I the identification signal and compares user access code UPPP with that registered in an address MFFF, and if a match is determined here, the door lock is released. The user thus passes through the first door. Subsequently, if the user wishes to gain access to a second automatic identification control apparatus II (doors of the second access level), he is first confirmed as being a registered person in the same manner used for the first automatic identification control apparatus I. If the user is found to be an authorized person or entry through the second door, the door lock is released, allowing passage.

As described above, the user can pass through a plurality of doors in which automatic identification control apparatuses of the present invention are installed, without any manipulation beyond the one-time input of the UPW data prior to passage through the first door. However, when the user is not in possession of the portable master key, or the door is not registered, passage is not allowed. Thus, only authorized persons can freely come and go through the doors, while unauthorized persons are barred.

For example, as exemplified by FIG. 15 which is a diagram of a sample house, the present invention can set user-dependent levels of access for the entrance and/or exit through a given automatic identification door opening/closing device. For example, the user access code of each family member is registered in automatic identification door opening/closing devices I and II installed as the main entrance, an exterior door and three common-access doors, so that the entire family has access to the premises and these rooms. Access to another room (e.g., the master bedroom) and another exterior door is controlled by an automatic identification door opening/closing device III, and accordingly, certain family members' access codes are registered therein, so that only those family members have access to that room and that door. Further, the user access code of a particular family member may be registered in an automatic identification door opening/closing device IV corresponding to a special compartment (e.g., a safe), and accordingly, this family member has access to all areas, while certain family members are restricted to level II areas (e.g., children) and certain other family members have access to all but the level IV area. Only those household members with registered access codes in the respective automatic identification door opening/closing devices are authorized access thereto, to control the entry and exit of unauthorized persons. Here, since the person in possession of a portable master key cannot recognize the specific code of an automatic identification door opening/closing device, a user access code cannot be registered without approval of the system's administrator. (In this case, the administrator may or may not be a family member.)

Also, as the portable master key only operates upon input of the user's password, even if the portable master key is lost or stolen, its use by third parties is prevented since the device automatically disables itself. Here, third party usage is curtailed by way of a predetermined time limit being applied to the enabled state upon input of the user's password. For example, if the predetermined time period from the enabled start time has passed, the portable master key is automatically disabled. Also, to countermeasure theft, whenever the portable master key is disengaged from its normal carrying mode, it is likewise disabled. Thus, by periodically verifying the normal carrying mode, illicit third party usage is checked. For example, if the portable master key is in the form of a wristwatch (FIG. 2C) or buckle (FIG. 2E), verification of the normal carrying mode can be performed by a switch being automatically operated as soon as the hasp is unlatched from its clasp, and for a ballpoint pen (FIG. 2A), the switch may be installed in the case beneath a carrying clip and in opposition thereto. When the portable master key in any form is removed as by accident or theft, release of the above-mentioned switch results in automatically disabling password entry.

On the other hand, to avoid any behavior that the authorized person or the user lends an enabled portable master key to an unauthorized person, a video camera apparatus such as a camcorder, etc., may be installed in the entrance and exit gate. Whenever the automatic identification control apparatus is operated, the camcorder is operated, for example, for three seconds, to take a picture of the passage of persons and record the photographed results. Since twenty persons per a minute can be photographed with an hour video tape, total 1,200 passages can be photographed and recorded. Accordingly, the camera recorder can be efficiently controlled in comparison with the conventional photographing system which adopts a continuous photographing method or an interval photographing method.

The present invention also enables monitor and control of entrance and exit of personnel and their office hours, as will be described below.

FIG. 16 is a block diagram of an automatic identification door opening/closing device with which the office hours of personnel can be monitored and controlled. FIG. 16 further comprises clock means 300 and printer 310 in addition to the automatic identification door opening/closing device of FIG. 9. Clock means 300 divides a predetermined clock signal to generate a data signal to measure seconds, and further divides this data signal to generate minute hour, day and year signals. Printer 310 may be internally installed or connected via the I/O ports of a microcomputer as an external printer.

Here, whenever personnel in possession of portable master key 100 pass through an automatic identification door opening/closing apparatus, his individual identification information and time of passage (supplied from clock means 300) are checked, which are then stored in storage means 240. Thus, if the printer is instructed to generate an output, control means 220 reads out the person's stored identification information, for example, employee number and office hours. Accordingly, working hours and absenteeism is checked and calculated, to be printed out on a record sheets as shown in FIG. 17. Also, the present invention can control the comings and goings of personnel, while recording individual information as well as the time. thus enabling the accurate monitoring of personnel, and assisting in crime prevention and the tracing of criminals.

FEE-LEVYING CONTROL SYSTEM

Figure 18:
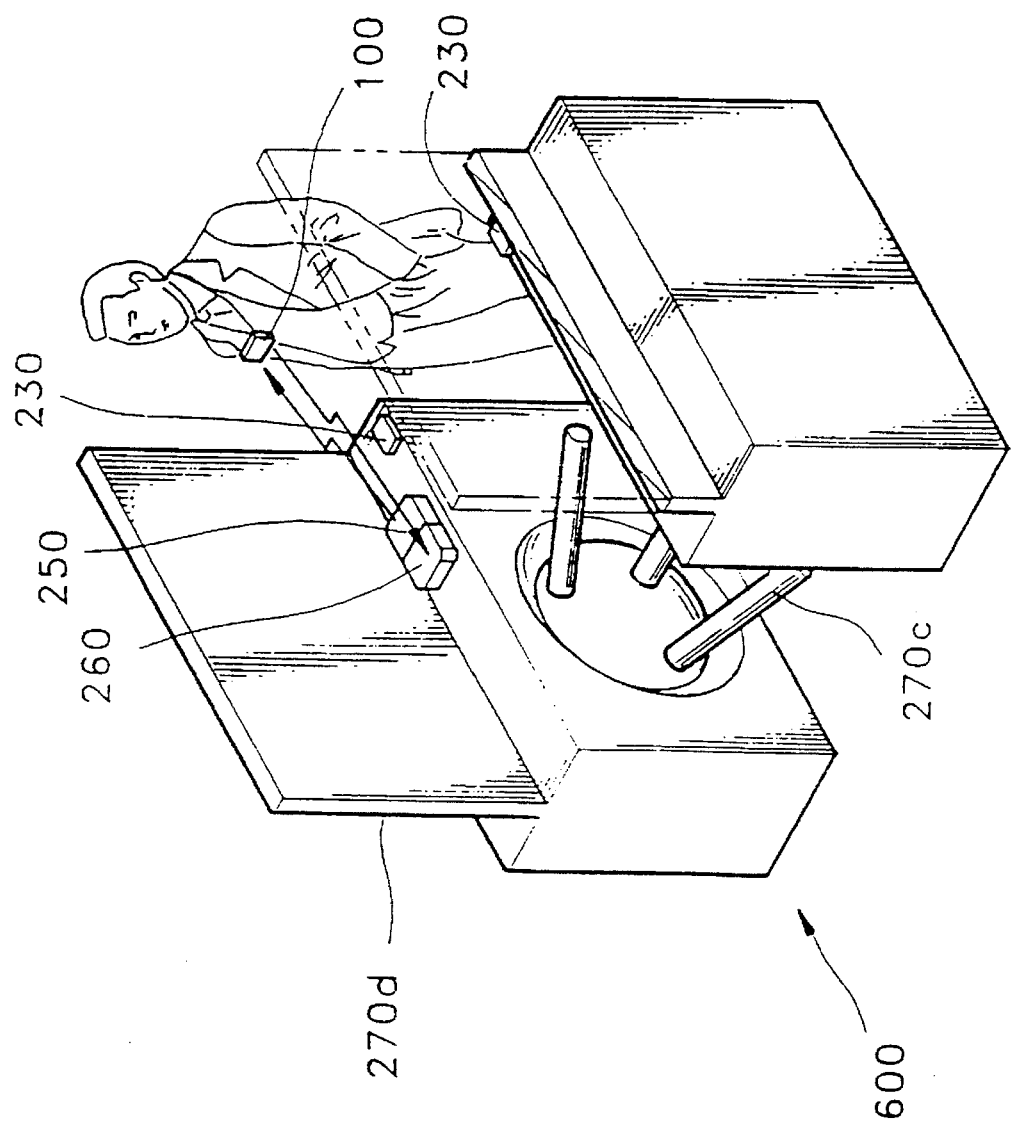
FIG. 18 is a view for explaining an attendance control system being one embodiment of the present invention.
Figure 19A:
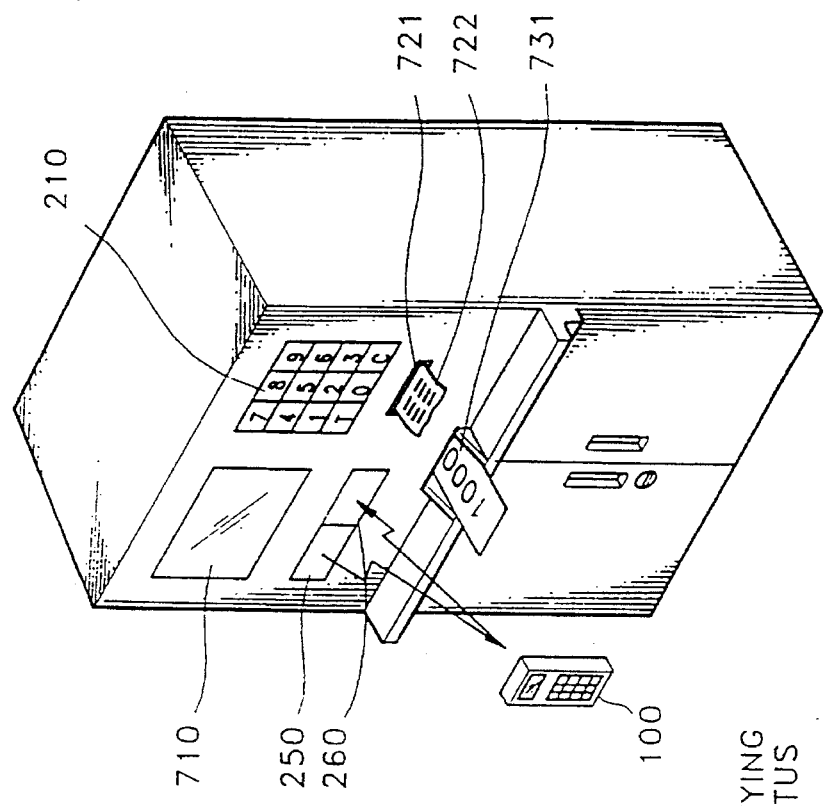
FIGS. 19A and 19B are a perspective view and a block diagram of the cash registering device being one embodiment of the present invention.
Figure 19B:
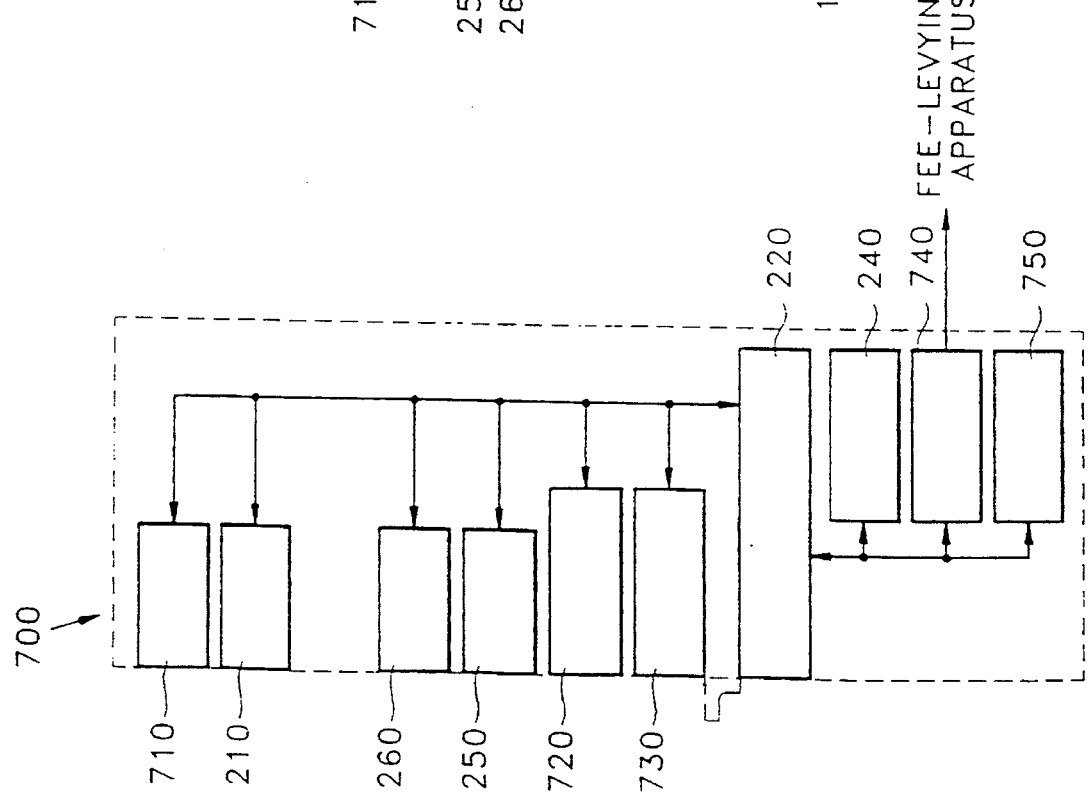

FIG. 18 is a view for explaining a tee-levying apparatus of an attendance fee control system, and FIGS. 19A and 19B are a prospective view and a block diagram of the cash registering device for the prepaid method. Fee levying apparatus 600 is identical to the above-mentioned automatic identification apparatus 200. Here, the only difference is that the equipment to be operated is composed of a turnstile 270c, and when a number of gates are installed, a shielding wall 270d of the approximate height of a person is provided to avoid the RF interference with a neighboring gate. Also, in cash registration apparatus 700, automatic identification apparatus 200 further comprises display 710, receipt issuance portion 720, bank note identifier 730, I/O interface portion 740 and floppy disk driver 750, with detection means 230 being deleted.

Figure 20:
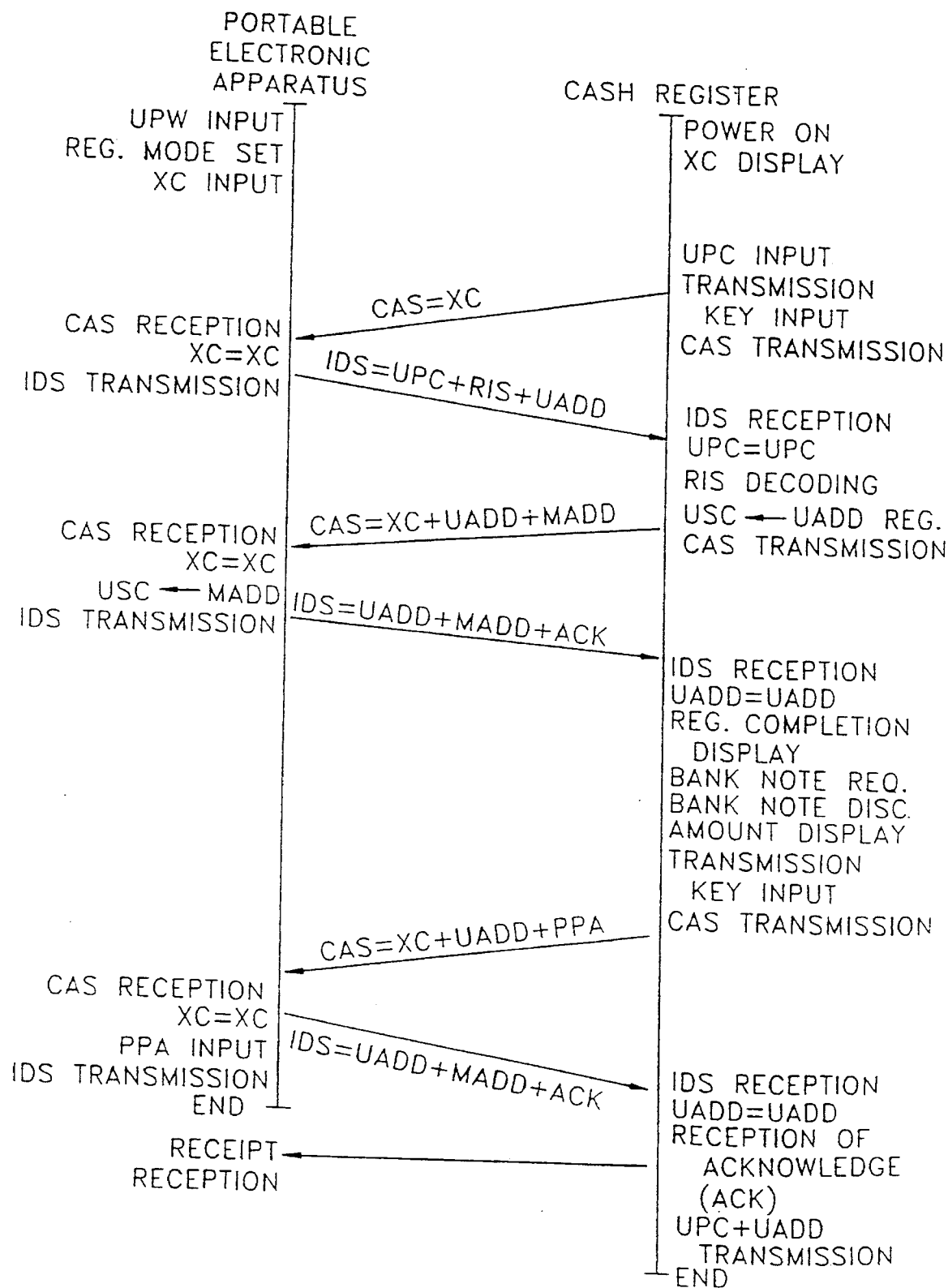
FIG. 20 is a flowchart diagram for explaining the cash-registering procedure of FIGS. 19A and 19B.

First of all, the operations of cash registration apparatus 700 and portable electronic apparatus 100 will be described with reference to FIG. 20.

The user inputs the UPW data to portable electronic apparatus 100, and presses the "REGISTRATION" key to set a registration mode. Subsequently, if the user presses the "REGISTRATION" key via input means 210 of cash registration apparatus 700, main controller 220 instructs a CRT or a liquid crystal display portion 710 to display "specific code." The user sees the displayed specific code XC and inputs the specific code to portable electronic apparatus 100. Subsequently, if a message to input user information (UPC) is displayed on display portion 710, the user inputs the UPC data via input means 210. If a "TRANSMISSION" key is pressed after the UPC data is input, main controller 220 transmits call signal CAS via transmitting means 250. Portable electronic apparatus 100 detects the XC data loaded on the received call signal CAS. If the input XC data matches the received XC data, the call signal, in this case, IDS (UPC+ RIS+ UADD), is transmitted. Here, UADD represents the address of the memory region where the XC data is stored. Cash registration apparatus 700 detects the UPC data from the identification signal which is received via receiving means 280 to compare the detected UPC data with the input UPC data, and if a match is determined, the RIS signal is decoded, and the received UADD data is written as new UPC data. Accordingly, the user's secret access code is registered, and a call signal, in this case, CAS (XC+UADD+ MADD), is transmitted. Portable electronic apparatus 100 receives the call signal and detects the XC data loaded on the received call signal. If the detected XC data matches the input XC data, the MADD data is written in a memory region USC for the corresponding user's secret code. Accordingly, registration of the specific code and the user access code is complete. Here. MADD represents the address of the memory region where the user access code is written. Subsequently, identification signal IDS (UADD+ MADD+ ACK)is transmitted.

Cash registration apparatus 700 receives the identification signal and detects the UADD loaded on the received identification signal. If the detected UADD is identical to the input UADD, completion of the registration of the specific code and the user's secret code is displayed, and then insertion of the bank note is required. If the user inserts the bank note through bank note insertion hole 731, bank note identifier 730 identifies a class of the inserted bank note. Then, an amount of the identified bank note is displayed on display portion 710, and the inserted bank note is transferred to a bank note storage unit. Subsequently, after the bank note of the desired amount is inserted, the user presses the "TRANSFER" key. Then, main controller 220 loads on the call signal, data corresponding to a prepaid amount (PPA) of money received according to the transfer key input for transmitting it.

Portable electronic apparatus 100 receives the call signal, that is, the CAS (XC+UADD+ PPA), and detects the XC loaded on the received call signal. Then, if the detected XC is identical to the XC stored in address UADD, the PPA is written in a predetermined memory region 135 as shown in FIG. 5. If such writing is completed, the control means of the portable electronic apparatus instructs the display portion to display the amount of the written PPA, and transmits identification signal IDS (UADD+MADD+ ACK). Then, the operation is completed.

Cash registration apparatus 700 receives the identification signal and detects the UADD loaded on the received identification signal. Then, cash registration apparatus 700 compares the detected UADD with the UADD written in address MADD. IF the detected UADD is identical to the written UADD, the reception is confirmed and the receipt is issued via receipt issuance portion 720. Then, the UPC and the UADD are supplied to fee levying apparatus 800 via I/O interface portion 740. At the same time, the receipt result is processed via the floppy disk drive. As a result, the UPC and the PPA are filed on the floppy disk.

As described above, the PPA information is written in portable electronic apparatus 100 using a prepaid method. Accordingly, portable electronic apparatus 100 improves the prepaid function adapted in the conventional prepaying card, e.g., a telephone card, subway ticket, etc.

Figure 21:
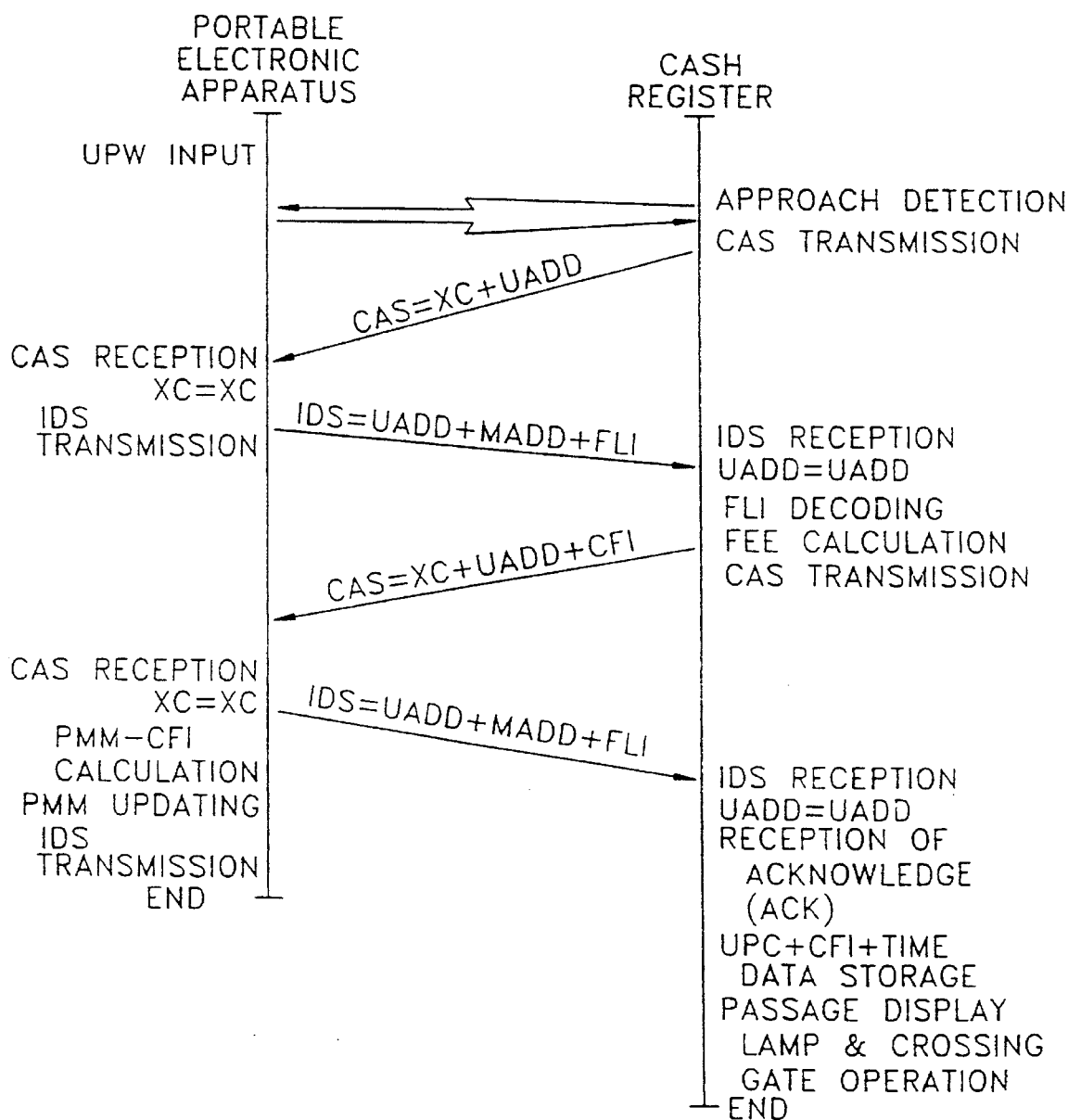
FIG. 21 is a flowchart diagram for explaining the prepaid fee-levying procedure being another embodiment of the present invention.

Referring to FIG. 21, when a user in possession of the prepaid type of portable electronic apparatus 100 passes through an entrance where levying apparatus 600 is installed (e.g., cafeteria, movie theater, etc.), the appropriate fee is automatically levied. In other words, if a person possessing such a device in its enabled state (i.e., his password is entered) approaches a fee-levying apparatus as shown in FIG. 18, the control means controls detection means 230 to detect the approach or passage of the person, and transmits call signal CAS (XC+ UADD) via transmitting means 250.

Portable electronic apparatus 100 compares the received XC data and the XC data written in address UADD, and if a match is determined, transmits identification signal IDS (UADD+ MADD+ FLI). Fee levying apparatus 600 receives the identification signal and compares the received UADD data with the UADD data written in address MADD, and if a match is determined, a fee-levying instruction FLI is decoded and the levied fee is calculated. Then, calculated fee information (CFI) is loaded on call signal CAS (XC+ UADD+ CFI) tier transmission.

Portable electronic apparatus 100 compares the XC data of the received call signal with the XC data written in address UADD, and if a match is determined, the amount represented by the CFI data is subtracted from that represented by the PPA data, and the PPA data is updated with the subtracted result. After updating, identification signal IDS (UADD+ MADD+ ACK) is transmitted. Fee-levying apparatus 600 receives the identification signal and confirms completion of the fee-levying operation. Accordingly, the UPC, CFI and current time information is filed and stored. At the same time, turnstile 370c is unlocked so as to allow rotation, or the passage display lamp is operated, signifying completion of the above operation. At this time, a printed seat ticket, i.e., theater or bus ticket, can also be issued.

PASSAGE FEE LEVYING SYSTEM

In a fee-levying system for use in connection with a toll road, parking lot or subway, user transit distances and times vary greatly, so the fees vary accordingly. When utilizing this embodiment of the present invention, the entrance location and time of entrance information am applied upon exiting.

Figure 22:
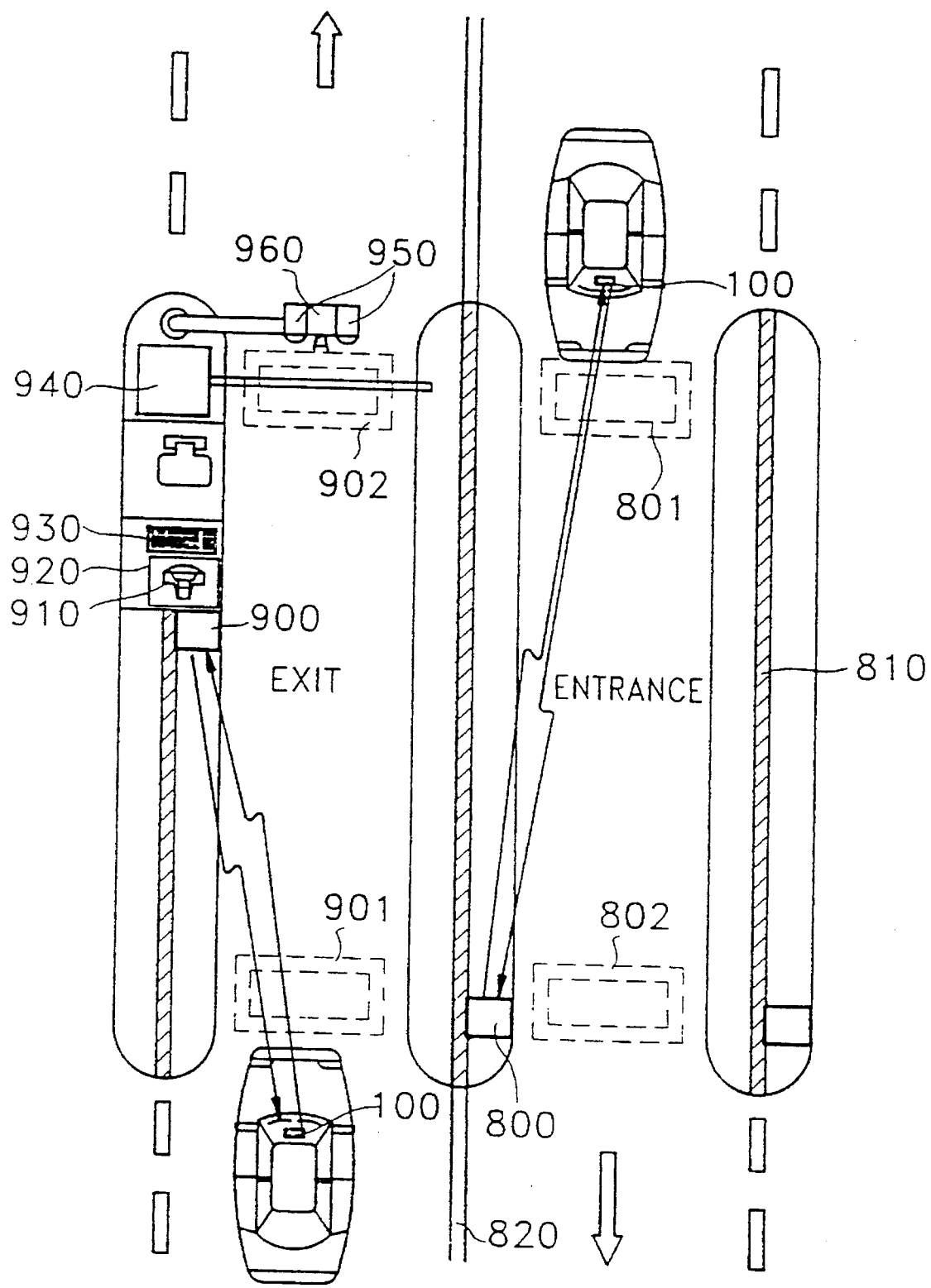
FIG. 22 is a view for explaining the toll gate fee-levying system being still another embodiment of the present invention.

FIG. 22 is a view for explaining an automatic fee-levying system for a highway toll gate. In FIG. 22, automatic identification control apparatus 800 is installed at an entrance, and automatic lee-levying apparatus 900 is installed at an exit. Automatic identification control apparatus 800 comprises vehicle approach detection sensor 801 and vehicle pass detection sensor 802.

Figure 23:
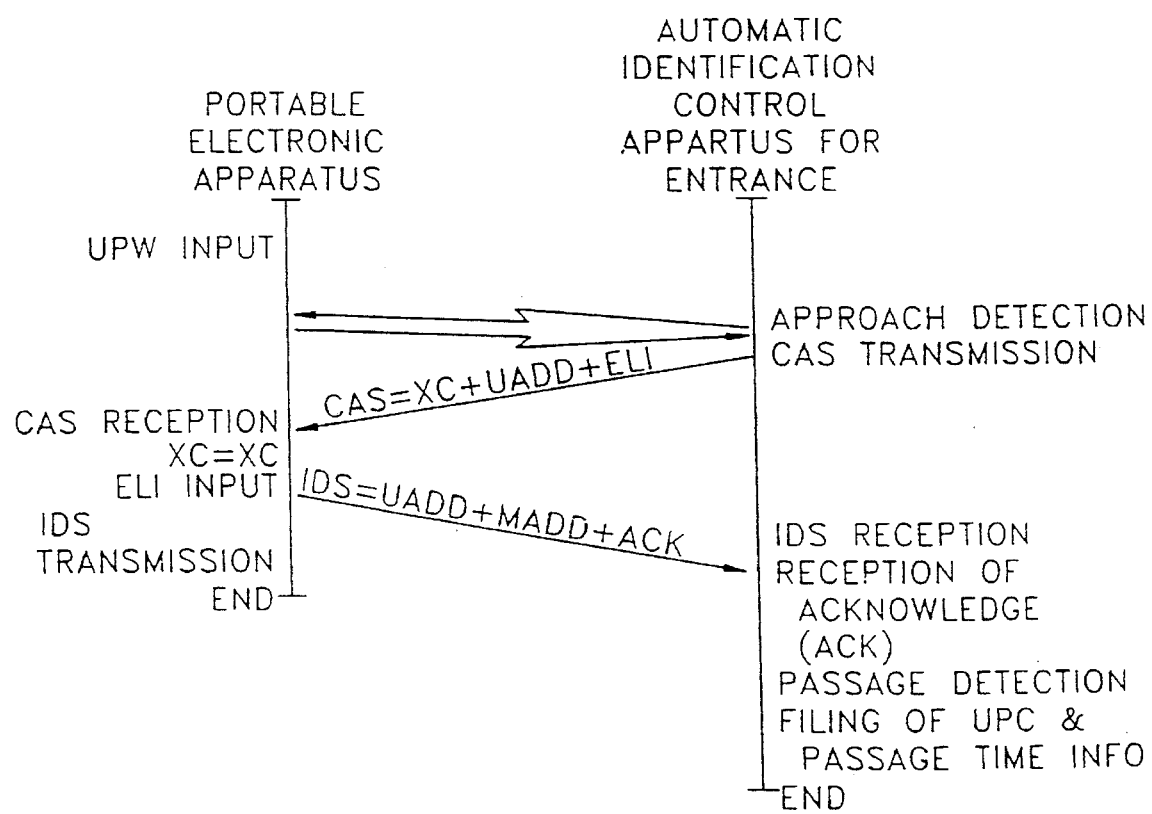
FIG. 23 is a flowchart diagram for explaining a mutual communication relationship between an automatic identification control apparatus and the portable electronic apparatus of FIG. 22, for entering.

Referring to FIG. 23, as a car and driver in possession of portable electronic apparatus 100 approaches an entrance gate, entrance automatic identification control apparatus 800 is enabled by vehicle approach detection sensor 801. Then, the automatic identification control apparatus 800 transmits call signal CAS (XC+ UADD+ ELI). Here, ELI is entrance location information.

Portable electronic apparatus 100 receives the call signal and compares the received XC data with the XC data written in address UADD, and if a match is determined, the received ELI data is written in the storage means. Then, portable electronic apparatus 100 transmits identification signal IDS (UADD+MADD+ ACK) and completes the operation. Entrance automatic identification control apparatus 800 receives the identification signal and confirms the reception of the identification signal. Then, the UPC data such as passage time information is filed and the operation is completed.

Figure 24:
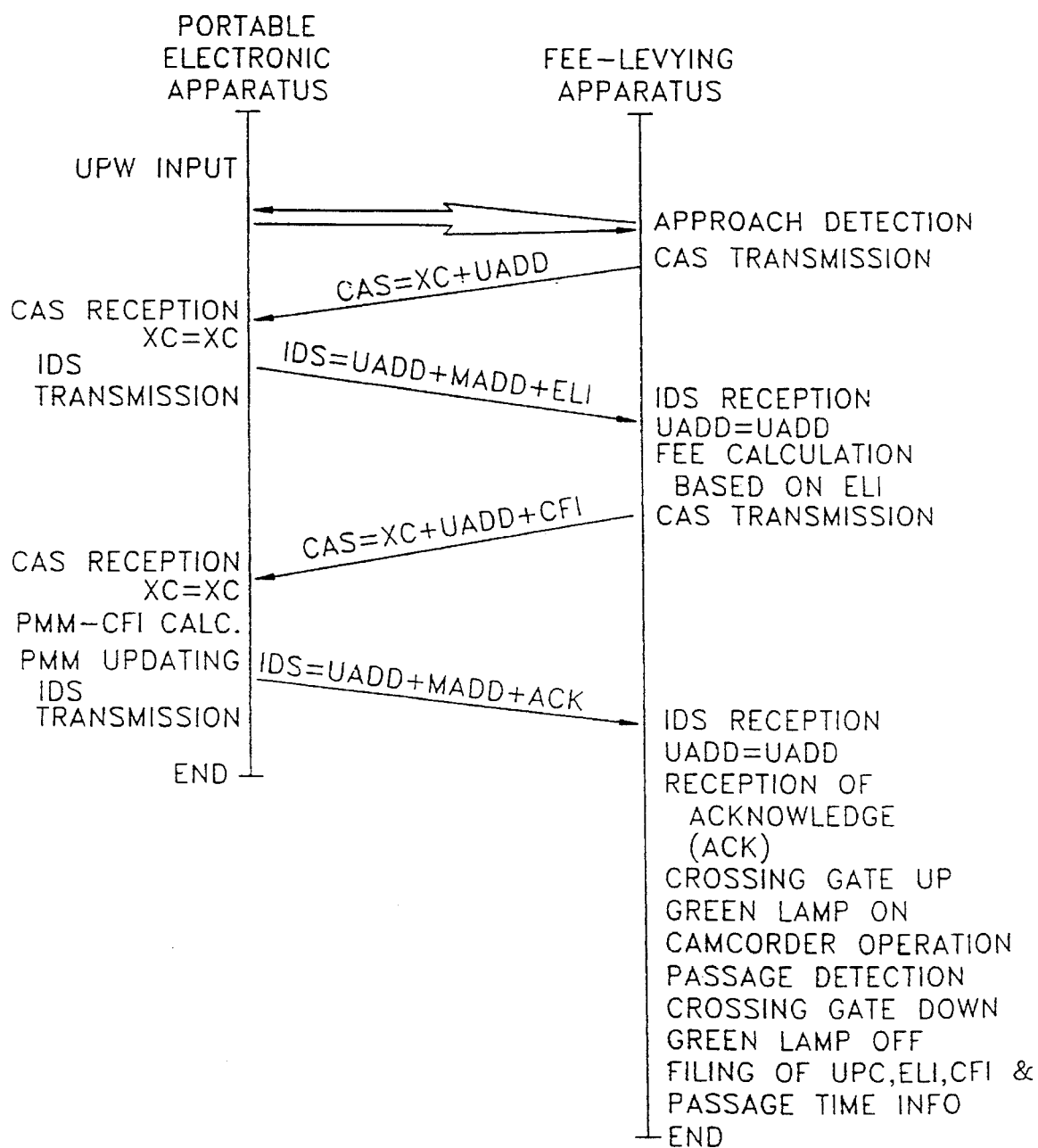
FIG. 24 is a flowchart diagram for explaining a mutual communication relationship between an automatic identification levying control apparatus and the portable electronic apparatus of FIG. 22, for exiting.

Referring to FIG. 24, a car and driver having gained access through an entrance gate approaches an exit gate, and automatic fee levying apparatus 900 is enabled by approach detection sensor 901 so as to transmit call signal CAS (XC + UADD). Portable electronic apparatus 100 receives the call signal and compares the received XC data with the registered XC data, and if a match is determined, portable electronic apparatus 100 transmits identification signal IDS (UADD+ MADD+ ELI). Automatic fee-levying apparatus 900 receives the identification signal and compares the received UADD with the registered UADD, and if a match is determined, automatic fee-levying apparatus 900 calculates the CFI data based on the ELI data stored in address UPC and the received ELI, and loads the calculated CFI data on call signal CAS to transmit the thus-loaded call signal CAS (XC+ UADD+ CFI). Portable electronic apparatus 100 receives the call signal and compares the received XC data with the registered XC, and if a match is determined, the received CFI data is subtracted from the written PPA which is then updated with the subtraction result value. Finally, identification signal IDS (UADD+MADD+ ACK) is transmitted and the operation is completed.

Automatic fee levying apparatus 900 receives the identification signal and compares the received UADD with the registered UADD, and if a match is determined, a crossing gate 940 is lifted and the green lamp in a display 950 is lit to indicate allowance of passage. Also, a camcorder 960 is momentarily operated for, say, two seconds, to record the passing vehicle. As the vehicle passes a gate, it is detected by a passage detection sensor 902, and then crossing gate 940 is lowered and display lamp 950 is turned off. Next, the UPC (vehicle type & number), ELI (place of access), the CFI (fee) and the time of passage information are all filed and the operation is completed. However, if the PPA data written in portable electronic apparatus 100 of the passing vehicle represents a smaller amount than that of the received CFI data, instead of confirmation signal ACK, portable electronic apparatus 100 sends an "insufficient funds" signal to automatic fee levying apparatus 900 which in turn transfers this signal to personal computer 910 to display the calculated fee on monitor 920 and generate an alarm signal. Upon notification of insufficient funds, the user may then pay in cash, so that crossing gate 940 can be raised by operation of keyboard 930. Reference numeral 810 represents an electromagnetic shielding wall to prevent RF interference with neighboring gates.

The embodiment as described above relates to an automatic fee levying system for a highway toll gate. However, an automatic parking-fee-levying system of a metered parking area calculates parking fees based on entering and exiting times, and can automatically levy a calculated parking fee. Also, an automatic subway boarding-fee-levying system transmits place-of-entrance information to the user's portable electronic apparatus via the entrance automatic identification control apparatus, and upon exiting, receives the place-of-entrance information and calculates the boarding fee, to thereby levy the calculated boarding fees from the PPA data written in the portable electronic apparatus. In this case, specific UPC information can be further provided, e.g., special fares for senior citizens, the military, students, etc. Accordingly, fare gradation can be done in the same manner as conventional subway-boarding-fee calculations.

AUTOMATIC CREDIT PURCHASE CONTROL SYSTEM

Figure 25:
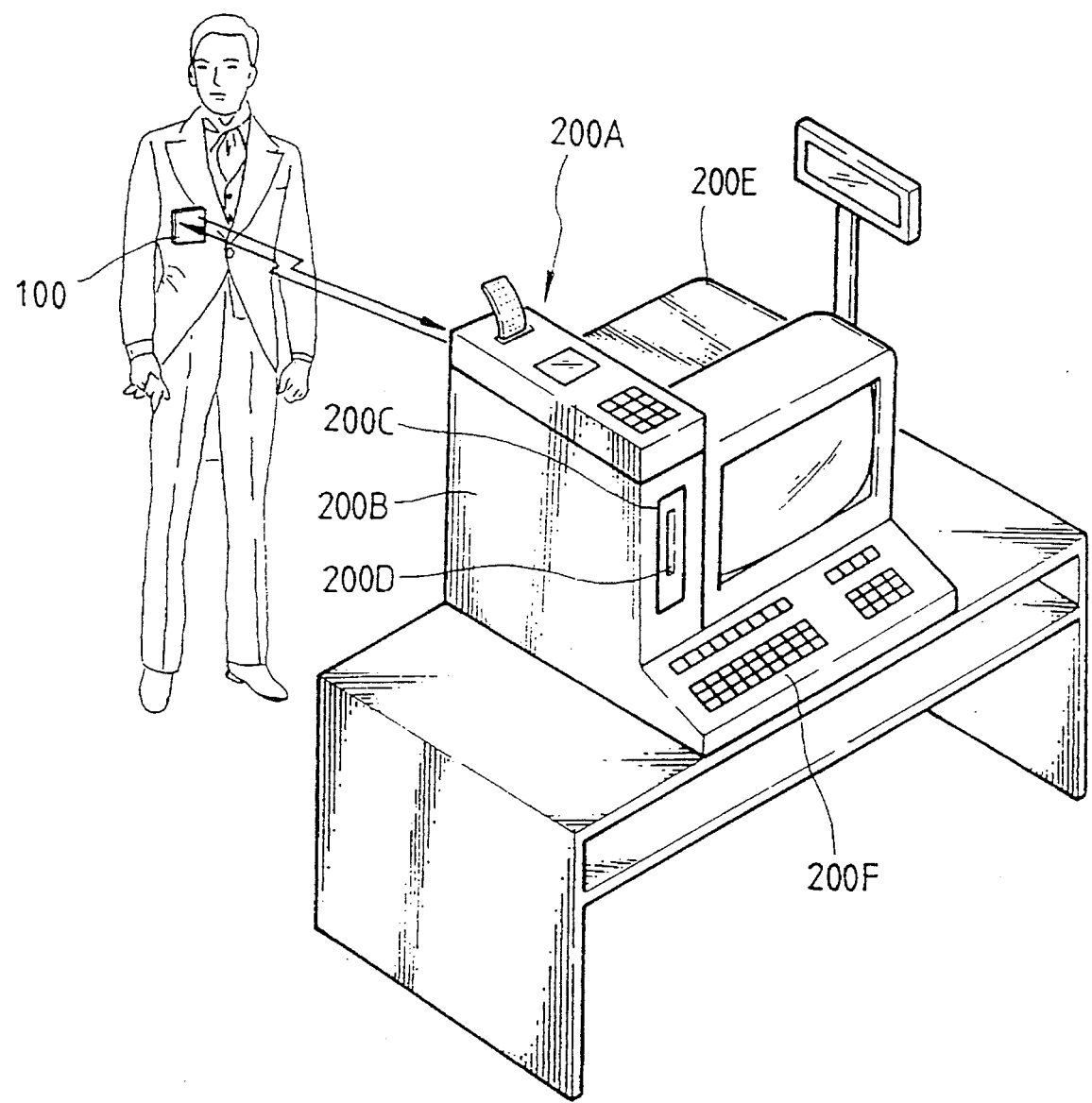
FIG. 25 is a view for explaining the automatic identification credit transaction system being yet still another embodiment of the present invention.

Referring to FIG. 25, an automatic credit purchase system is installed in a retail outlet, e.g., department store, chain store, etc. Such a system comprises automatic identification control apparatus 200A, personal computer 200B, floppy-disk drive 200C, floppy-disk 200D, monitor 200E and keyboard 200F.

Figure 26:
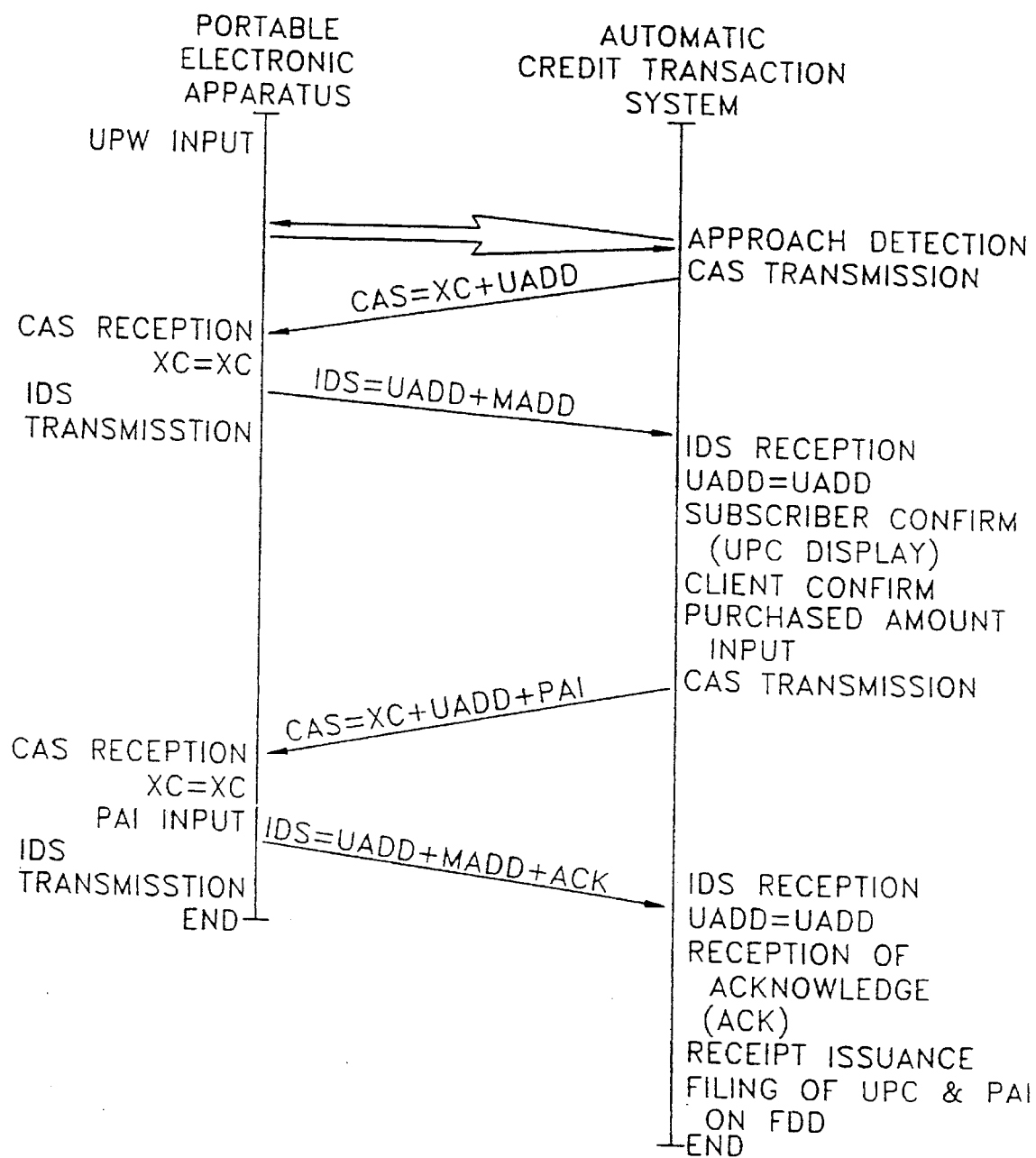
FIG. 26 is a flowchart diagram for explaining a mutual communication relationship between the automatic identification credit transaction system and the portable electronic apparatus of FIG. 25.

Referring to FIG. 26, if a user purchasing a commercial product inputs his password into portable electronic apparatus 100, and stands in front of automatic identification control apparatus 200A, call signal CAS (XC+ UADD) is transmitted upon approach detection. Portable electronic apparatus 100 receives the call signal and compares the received XC data with the registered XC data, if a match is determined, identification signal IDS (UADD+ MADD) is transmitted. Automatic identification control apparatus 200A receives the identification signal and compares the received UADD with the registered UADD, and if a match is determined, the UPC (personal identification and account numbers) is displayed on monitor 200E via personal computer 200B. The administrator then confirms whether the displayed information agrees with the personal identification information supplied by the user, and if so, the price of the purchased product is input via keyboard 200F. Then, if the "ENTER" key is pressed, the purchasing amount information (PAI) corresponding to the calculated total is transferred to automatic identification control apparatus 200A. Next, automatic identification control apparatus 200A transmits call signal CAS (XC+ UADD+PAI). Portable electronic apparatus 100 receives the call signal and compares the received XC data with the registered XC data, and if a match is determined, stores the received PAI data and transmits identification signal IDS (UADD+ MADD+ ACK), thus completing the operation.

That is, automatic identification control apparatus 200A receives the identification signal and compares the received UADD with the registered UADD, and if a match is determined, acknowledges the reception of the identification signal and controls the receipt issuance unit to issue a receipt. Then, the UPC-plus-PAI information is filed on floppy-diskette 200D of floppy-diskette driver 200C via personal computer 200B and the operation is completed. Here, when the seller or the administrator presents the floppy-diskette to the credit card company or bank, the transaction amount is remitted. The credit card company or bank then deducts the amount from the client's account, and sends notification to the client.

AUTOMATIC BANKING SYSTEM

Figure 27A:
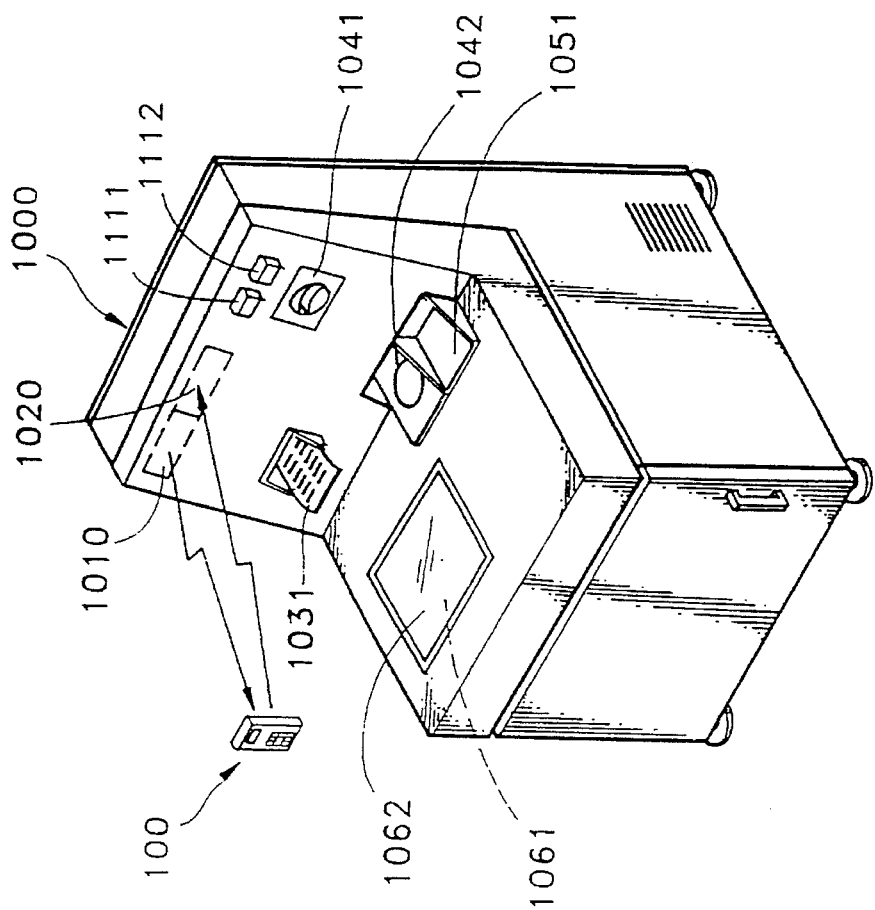
FIGS. 27A and 27B are a perspective view and a block diagram of the automatic banking system being still yet a further embodiment of the present invention.
Figure 27B:
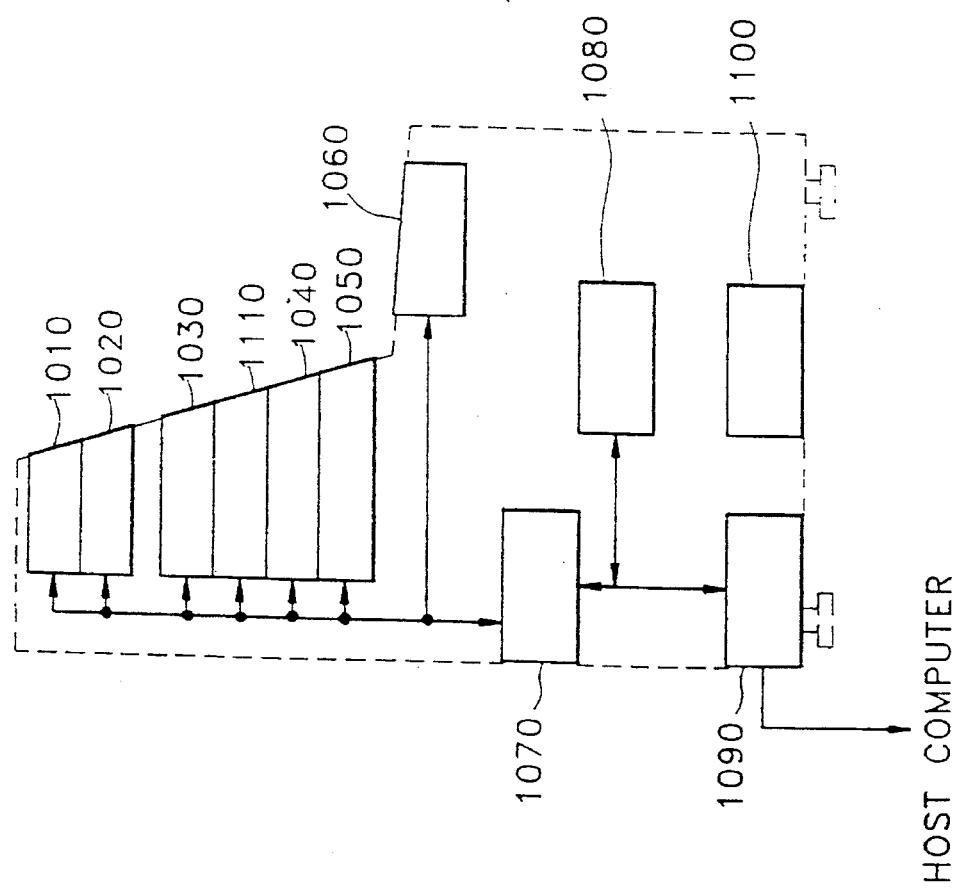

Referring to FIGS. 27A and 27B, an automatic banking system according to the present invention is installed at a bank. Here, an automatic banking system 100 comprises transmitting means 1010, receiving means 1020, a slip issuance portion 1030, a coin processing portion 1040, a bank note processing portion, display and key input means 1060, a main controller 1070, a filing portion 1080, an I/O interface portion 1090 and an power supply portion 1100. Also, a coin outlet 1042, a bank note inlet/outlet 1051 and a CRT 1061 are installed in the horizontal surface of the panel of automatic banking system 1000. Further, a contact panel switch 1062 is fixed on the surface of CRT 1061 to sense contact with the surface and the location thereof, and at each step of a transaction, mode selection keys and/or data keys are displayed on CRT 1061, and contact panel switch 1062 detects key input as with any keypad. A slip issuance portion 1030 prints deposit slips, withdrawal slips, or remittance slips to other accounts, and discharges the printed slip through slip outlet 1031. A coin processing portion 1040 discriminates denominations and counts the money entering a coin inlet 1041, with slugs and damaged coins being discharged via coin outlet 1041. Also, a bank note processing portion 1050 discriminates denominations and counts the money entering a bank note inlet/outlet 1051, with counterfeit notes being rejected. For cash withdrawal, coins are dispensed via a coin outlet 1042 and bank notes are dispensed via bank note inlet/outlet 1051. A main controller 1070 is connected with the host computer via I/O interface portion 1090 for on-line connections, to process transactions automatically. A filing portion 1080 composed of a floppy-diskette driver is controlled in case of off-line connections. Reference numeral 1110 is power and call key input portion in which reference numeral 1111 is a power key and 1112 is a clerk call key.

Figure 28:
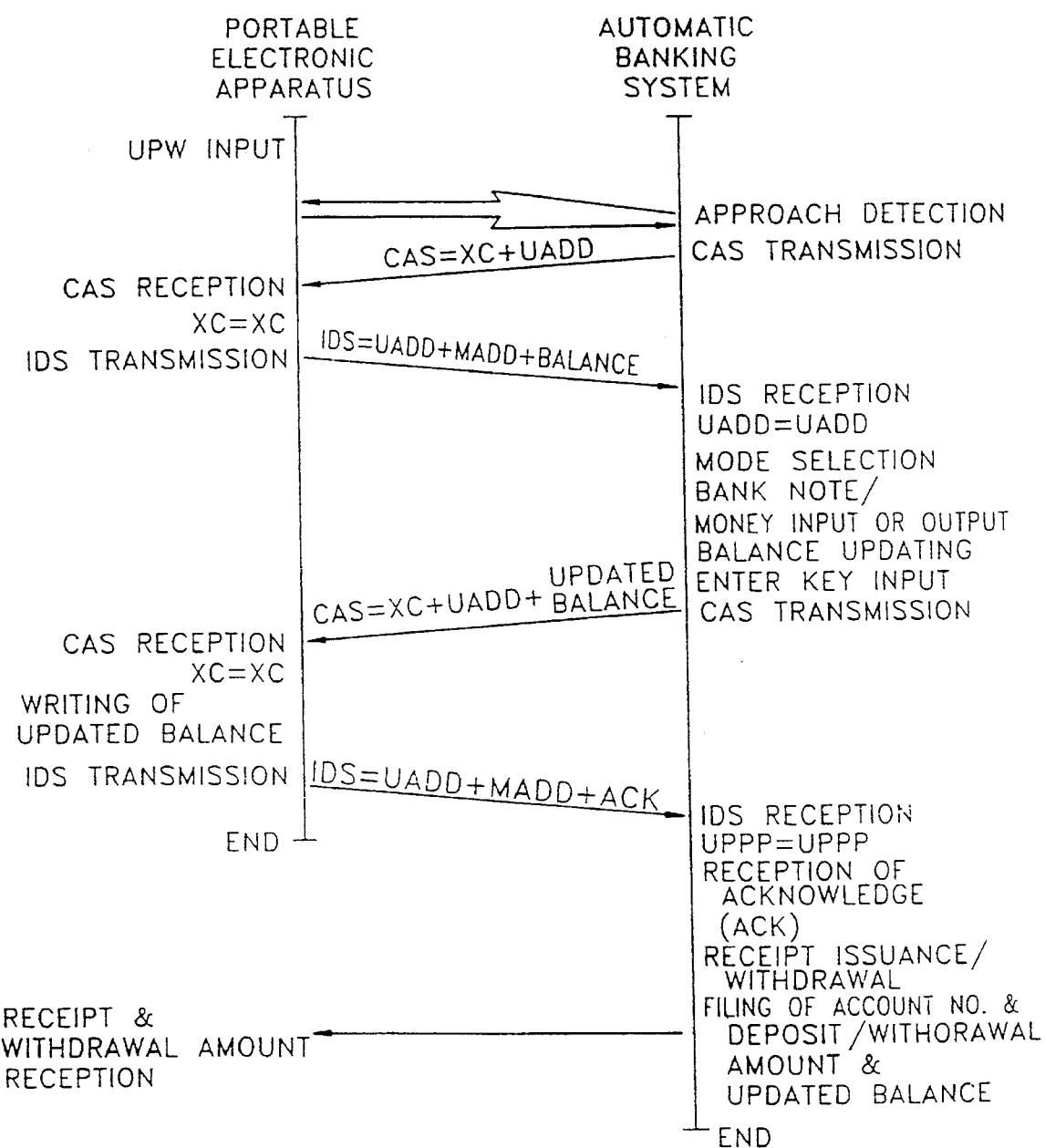
FIG. 28 is a flowchart diagram for explaining the operation of the automatic banking system of FIGS. 27A and 27B.

Operation of the automatic banking system having such a construction as described above and according to the present invention will be described below with reference to FIG. 28.

Figure 29A:
Figure 29B:
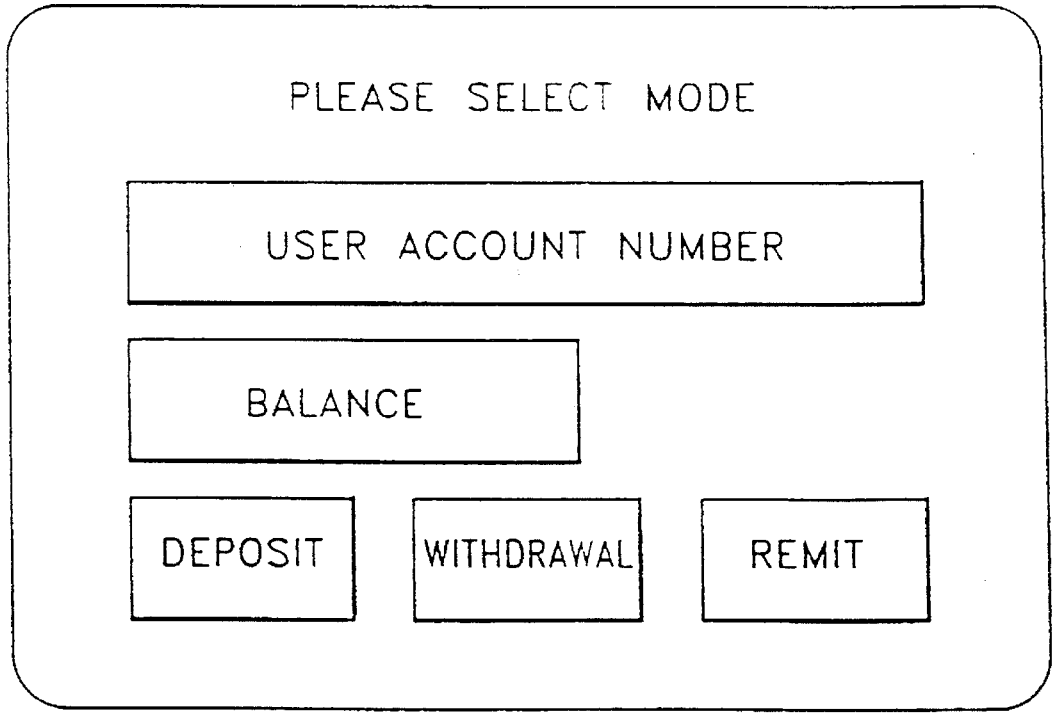

A user, while in possession of portable electronic apparatus 100, enables automatic banking system 1000 by pressing a power key 1111, thus displaying a greeting on CRT 1061, for example "HELLO . . . PLEASE WAIT A MOMENT," as shown in FIG. 29A, and transmitting call signal CAS (XC+ UADD) via transmitting means 1010. Portable electronic apparatus 100 receives the call signal and compares the received XC data and the XC data stored in address UADD, and if a match is determined, identification signal IDS (UADD+ MADD+ BALANCE) is transmitted. Automatic banking system 1000 receives the identification signal and compares the received UADD data with the UADD registered in address MADD, and if a match is determined, CRT 1061 displays the user's account number, the received balance according to the UADD data and a prompt, for example "CONFIRMED . . . PLEASE SELECT MODE," as shown in FIG. 29B. The user then selects the desired mode key: deposit, withdrawal or remittance.

If, for example, the deposit mode key is pressed, CRT 1061 displays an appropriate prompt message, e.g., "PLEASE ENTER DEPOSIT AMOUNT" as shown in FIG. 29C. Then, the user deposits his amount via bank note inlet/outlet 1051 and/or coin inlet 1041, so that automatic banking system 1000 can count the deposited money via bank note processing portion 1050 and coin processing portion 1040, and displays the recognized amount on CRT 1061. Upon pressing an "ENTER" key, the recognized amount is added to the balance of the user's account, to update the old balance with a new balance and transmit call signal CAS (XC+ UADD+ UPDATED BALANCE) via transmitting means 1010. Portable electronic apparatus 100 receives and acknowledges the call signal, and then stores the received updated balance. Then, portable electronic apparatus 100 transmits an identification signal for confirmation, which terminates the program. Automatic banking system 1000 receives the identification signal and confirms reception. When reception is confirmed, a "THANK YOU!" message or the like is displayed on CRT 1061, as shown in FIG. 29D. Then, a deposit slip is issued via slip issuance portion 1031. At this time, in case of on-line connections, information pertaining to the user's account number, deposited amount and updated balance is transmitted to the host computer via I/O interface portion 1090. This information can be stored in filing portion 1080 if not on-line, which also terminates the program.

In the withdrawal mode, as shown in FIG. 29E, an appropriate prompt is displayed on CRT 1061, for example "PLEASE ENTER WITHDRAWAL AMOUNT." When the user enters the desired amount and denomination by pressing the ten key display on CRT 1061 and presses the "ENTER" key, the entered amount is subtracted from the balance and the old balance is updated with a new balance. Then, call signal CAS (XC+UADD+ UPDATED BALANCE) is transmitted. Next, portable electronic apparatus 100 receives the call signal and stores the updated balance. Then, identification signal IDS (UADD+ MADD+ ACK) is transmitted. Automatic banking system 1000 receives the identification signal and confirms reception. Once the reception is confirmed, the withdrawn amount is discharged through coin outlet 1042 and bank note inlet/outlet 1051 according to the selected denominations. Then, a withdrawal slip on which the date of withdrawal, amount, etc., are printed is issued through slip outlet 1031. Also, as in the deposit mode, the withdrawal information is transmitted and filed, to then complete the operation.

At the remittance mode, as shown in FIG. 29F, a guidance statement of "PLEASE INPUT YOUR ACCOUNT NUM- BER AND REMITTANCE AMOUNT OF MONEY" is displayed on CRT 1061. If the user inputs the receiver's account number and the remittance amount of money and then presses the "ENTER" key, the corresponding remittance amount of money is deducted from the balance and call signal CAS (XC+UADD+ UPDATED BALANCE) is transmitted. Then, if portable electronic apparatus 100 responds to the call signal and transmits the identification signal, automatic banking system 1000 receives the identification signal and confirms the reception. Then, the remittance slip in which the remitting date, the receiver's account number and the remittance amount of money, etc are printed is issued and the remittance information is transmitted to the host computer via I/O interface portion 1090. Thus, the operation is completed.

As described above, in the automatic banking system according to the present invention, deposits, withdrawals and remittances can be automatically processed. Thus, the card, bankbook transfer mechanism, bankbook printing apparatus, etc., which are necessary for the conventional IC card system are unnecessary with the present invention, because the portable electronic apparatus can replace the bankbook. Accordingly, the automatic banking system can be simply constructed, to reduce costs. Also, since the user does not need to have separate bankbooks for each bank or each account, he can integrate and control the various conventional bankbooks with a single portable electronic apparatus. Also, the user can check on his banking transactions at any time or place via the display means of the portable electronic apparatus.

In the electronic identification system having remote automatic response performance of the present invention as described above, if the user purchases a portable electronic apparatus and registers it with an automatic identification control apparatus, each can communicate with the other. Accordingly, the present invention facilitates registration and administration, in comparison with the conventional IC card. Further, using the integration-control features of the portable electronic apparatus and an intended automatic identification control apparatus, the present invention provides for freely accessing a residence, office or public facility equipped with the control apparatus, whenever a user is in possession of the portable electronic apparatus. Also, once the password is input, the conveyance of the access code of a registered portable electronic apparatus is carried out without manipulation. Accordingly, the present invention enhances convenience.

Also, since the portable electronic apparatus and the automatic identification control apparatus are registered with each other for mutual identification, security is increased. In the registration procedure, since neither the user nor the administrator expose their password or specific code and the actual registered code is different from the exposed code, neither party can recognize the registered code. Accordingly, neither the user nor the administrator can commit fraud or fabricate substitute devices, thereby greatly increasing reliability and safety.

Also, both prepaying and credit purchase methods are possible, to absorb and integrate existing card systems.

Also, since the present invention can be applied to a toll gate system, traffic bottlenecks at toll booths are reduced.

The present invention is not limited in the above embodiment, and may be variously modified within the spirit of the technical concept of the invention.

What is claimed is:

1. A prepaying type of electronic identification system having remote automatic response capability, comprising:

a portable electronic apparatus which, in a registration mode, is enabled by a user's password input, and if a first specific code loaded on a first-received call signal matches one of a plurality of first specific codes registered in a first memory, stores data corresponding to a prepaid amount of money and loaded on said first-received call signal, into a second memory, and simultaneously transmits a user access code corresponding to said matched first specific code and received identification data by loading both on a first identification signal, and in a normal mode if a specific code loaded on a second-received call signal matches one of a plurality of second specific codes registered in said first memory, transmits a user access code corresponding to said matched second specific code by loading it on a second identification signal and if a specific code loaded on a third-received call signal matches said matched second specific code, stores the remainder of money in which received money loaded on said second call signal is subtracted from the prepaid money into said second memory and simultaneously transmits a third identification signal in the same method as that of said first identification data;

a cash register which, if a registration mode is set by a user in possession of said portable electronic apparatus, transmits both data corresponding to a prepaid amount of money and a specific code via said first call signal and if said user access code loaded on said received first identification signal matches one of a plurality of user access codes registered in a third memory, issues a receipt for said prepaid amount of money in response to said received identification information; and an automatic identification fee-levying apparatus which, if the approach of a user in possession of said portable electronic apparatus is detected, transmits said second call signal loaded with said second specific code, and if said user access code loaded on said received second identification signal matches one of a plurality of user access codes registered in the fourth memory, calculates a levying amount to transmit both said second specific code and said calculated levying amount via said third call signal, identifies a reception in response to said received third identification signal, operates a piece of equipment to be controlled, and files individual identification data in connection with said user access code and said calculated levying amount.

2. The prepaying type of electronic identification system having remote automatic response capability as claimed claim 1, wherein said piece of equipment to be controlled is toll gate system adaptable to a public, paid-attendance facility.

3. The prepaying type of electronic identification system having remote automatic response capability as claimed in claim 1, wherein said piece of equipment to be controlled of said automatic identification fee-levying apparatus is a ticket-selling unit.

4. An electronic identification system having remote automatic response capability, comprising:

a portable electronic apparatus enabled by a user's password input and stores data corresponding to a prepaid amount of money into a first memory, which, if a specific code loaded on a received first call signal matches one of a plurality of specific codes registered in a second memory, stores entrance information loaded on said first call signal into said second memory, and if a specific code loaded on a received second call signal matches said specific code registered in said first memory, transmits both a user access code corresponding to said specific code and said entrance information via a first identification signal, stores the remainder in which the levying fee loaded on a received third call signal is subtracted from the stored prepaid amount into said first memory, and transmits both said user access code and said received identification information via a second identification signal;

a first automatic identification control apparatus installed at the entrance, which, if the approach of a mobile object is detected, transmits said first call signal to said portable electronic apparatus; and a second automatic identification control apparatus installed at an exit, which, if the approach of said mobile object is detected, transmits said second call signal, if the user access code loaded on said received first identification signal matches one of a plurality of user access codes registered in said first memory, calculates said levying fee according to individual identification information stored in said second memory in connection with said entrance information and said user access code and transmits said calculated levying fee via said second call signal, and if a reception is identified in response to said second identification signal, displays a pass allowance and files said individual identification information, levying fee and the time of passage.

5. An electronic identification system having remote automatic response capability as claimed in claim 4, Wherein said individual identification information contains a car's make and license number.

6. An electronic identification system having remote automatic response capability as claimed claim 5, wherein said entrance information indicates entry location and said levying fee indicates a passage fee.

7. An electronic identification system having remote automatic response capability as claimed in claim 4, wherein said entrance information indicates entrance time and said levying tee is a parking fee.

8. An electronic identification system having remote automatic response capability as claimed in claim 4, wherein said second automatic identification control apparatus videotapes said mobile object by operating a video recording apparatus at the same time of passage.

9. An electronic identification system having remote automatic response capability, comprising:

a portable electronic apparatus enabled by a user's password input, and if a specific code loaded on a received first call signal matches one of a plurality of specific codes registered in a first memory, loads a user access code corresponding to said matched specific code onto a first identification signal and transmits the access-code-loaded identification signal, and if a specific code loaded on a received second call signal matches said specific code, stores received loan transaction information into a second memory and transmits a second identification signal composed of both said user access code and a reception confirmation signal; and an automatic identification credit transaction apparatus which, if the approach of a user in possession of said the portable electronic apparatus is detected, transmits said first call signal, receives said first identification signal and displays individual user identification information stored in connection with said user access code, and if the loan transaction amount is input, transmits both said specific code and said loan transaction information via said second call signal, files said individual user identification information and loan transaction information in response to said received second identification signal and issues a credit transaction receipt.

10. An electronic identification system having remote automatic response capability as claimed in claim 9, wherein said individual user identification information comprises a user identification number and an account number for a correspondent bank.

\* \* \* \* \*